(12) United States Patent
Mondragon-Torres et al.

(10) Patent No.: US 7,561,618 B2
(45) Date of Patent: Jul. 14, 2009

(54) RECONFIGURABLE CHIP LEVEL EQUALIZER ARCHITECTURE FOR MULTIPLE ANTENNA SYSTEMS

(75) Inventors: Antonio F. Mondragon-Torres, Murphy, TX (US); Steven P. Pekarich, Rowlett, TX (US); Timothy M. Schmidl, Dallas, TX (US); Aris Papasakellariou, Dallas, TX (US); Anand G. Dabak, Plano, TX (US); Eko N. Onggosanusi, Allen, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 11/105,755

(22) Filed: Apr. 14, 2005

(65) Prior Publication Data
US 2005/0243955 A1    Nov. 3, 2005

Related U.S. Application Data

(60) Provisional application No. 60/567,218, filed on Apr. 30, 2004.

(51) Int. Cl.
*H03H 7/30*   (2006.01)
(52) U.S. Cl. ...................................... 375/232
(58) Field of Classification Search ................ 375/232, 375/229, 235; 708/322, 323
See application file for complete search history.

(56) References Cited

U.S. PATENT DOCUMENTS

| 7,010,070 B2* | 3/2006 | Li et al. ....................... 375/349 |
| 2003/0133424 A1* | 7/2003 | Liang et al. .................. 370/335 |
| 2004/0127164 A1* | 7/2004 | Mondragon-Torres et al. ... 455/67.11 |

* cited by examiner

*Primary Examiner*—Khai Tran
(74) *Attorney, Agent, or Firm*—Ronald O. Neerings; Wade James Brady, III; Frederick J. Telecky, Jr.

(57) ABSTRACT

A system comprising a plurality of adaptive equalizers adapted to couple to a plurality of receive antennas, each of the antennas capable of receiving a multipath delay profile estimate (MDPE), control logic interconnecting at least some of the adaptive equalizers, and a control mechanism that, according to different MDPEs, configures at least some of the adaptive equalizers and control logic.

21 Claims, 19 Drawing Sheets

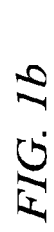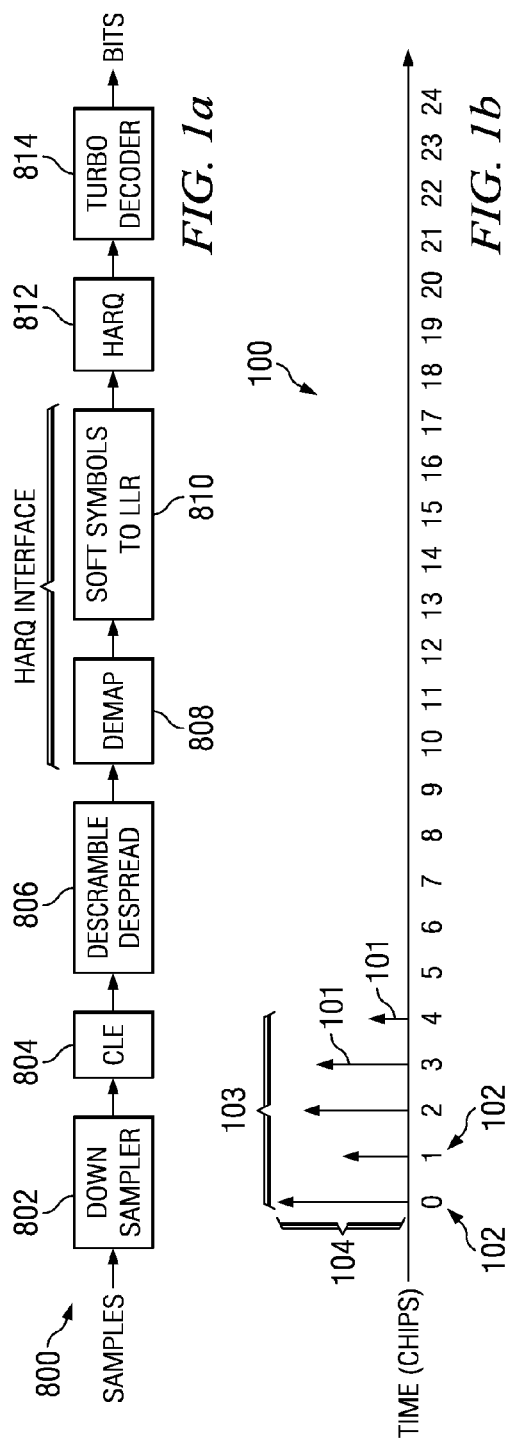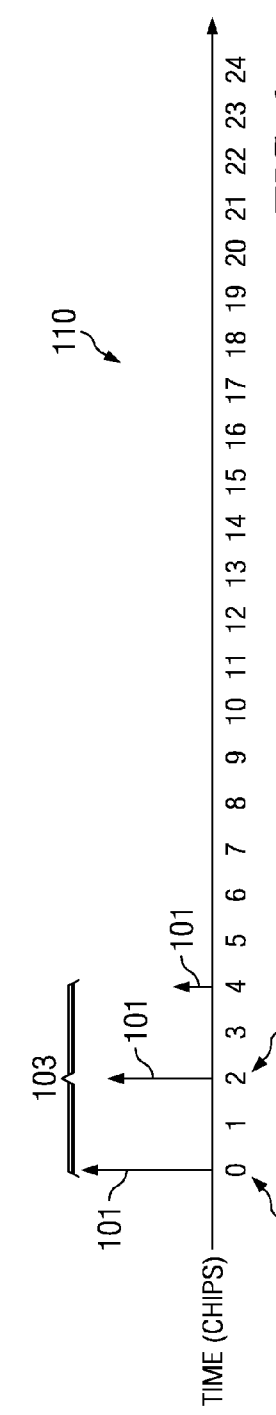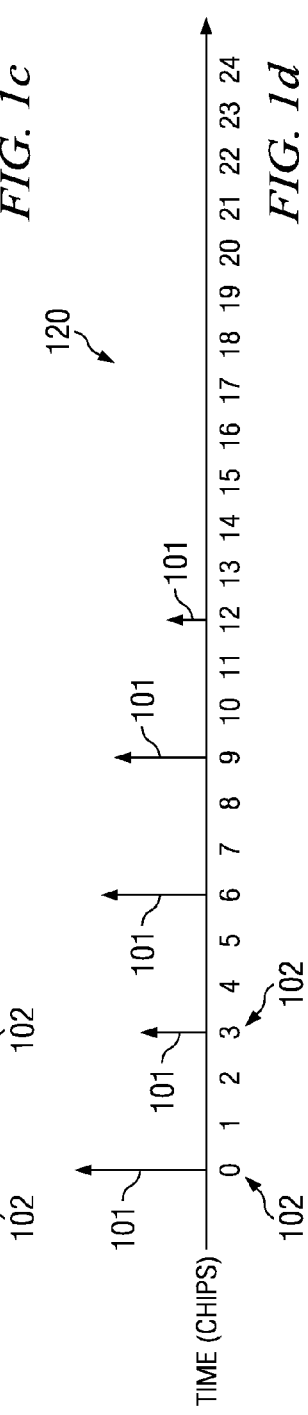

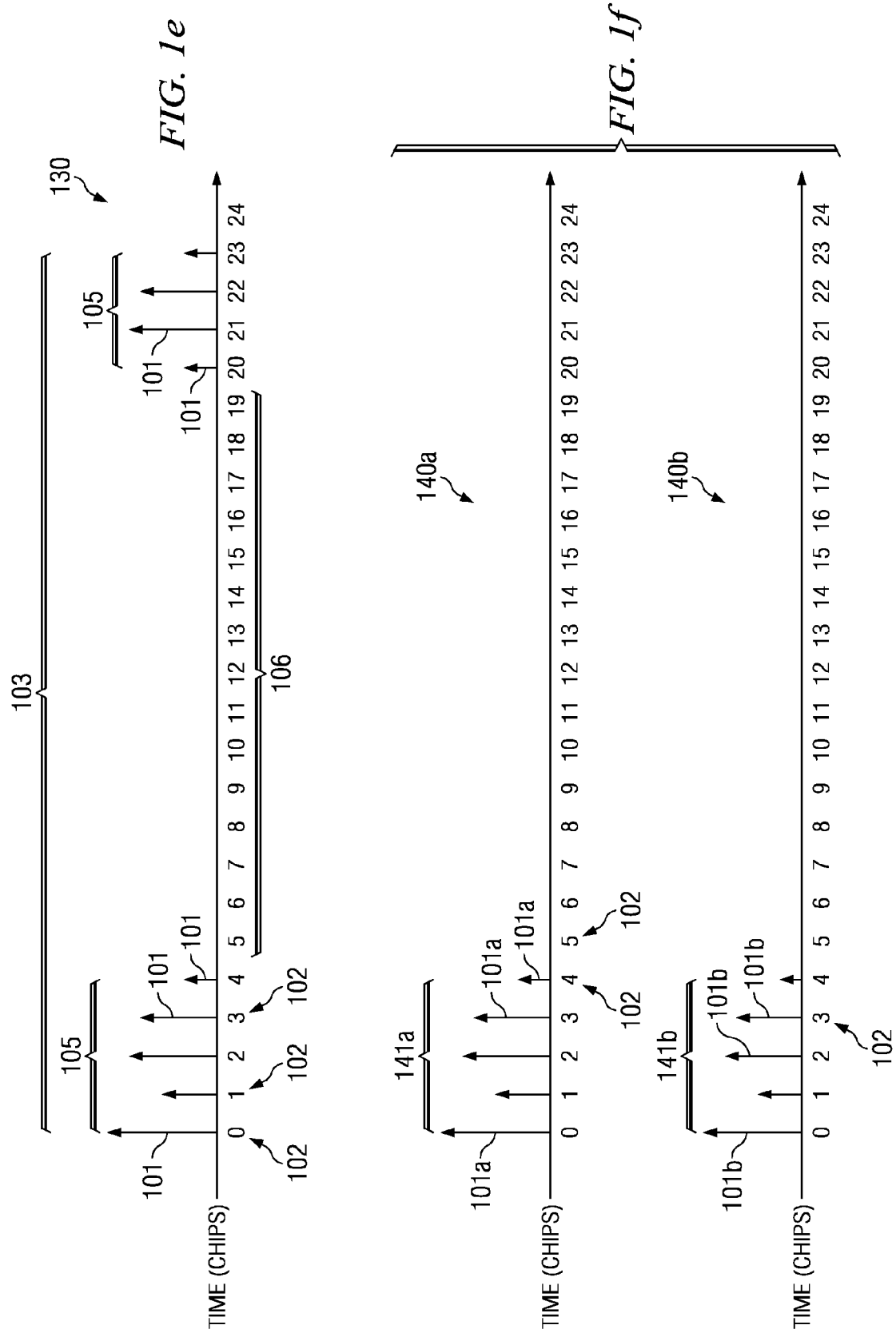

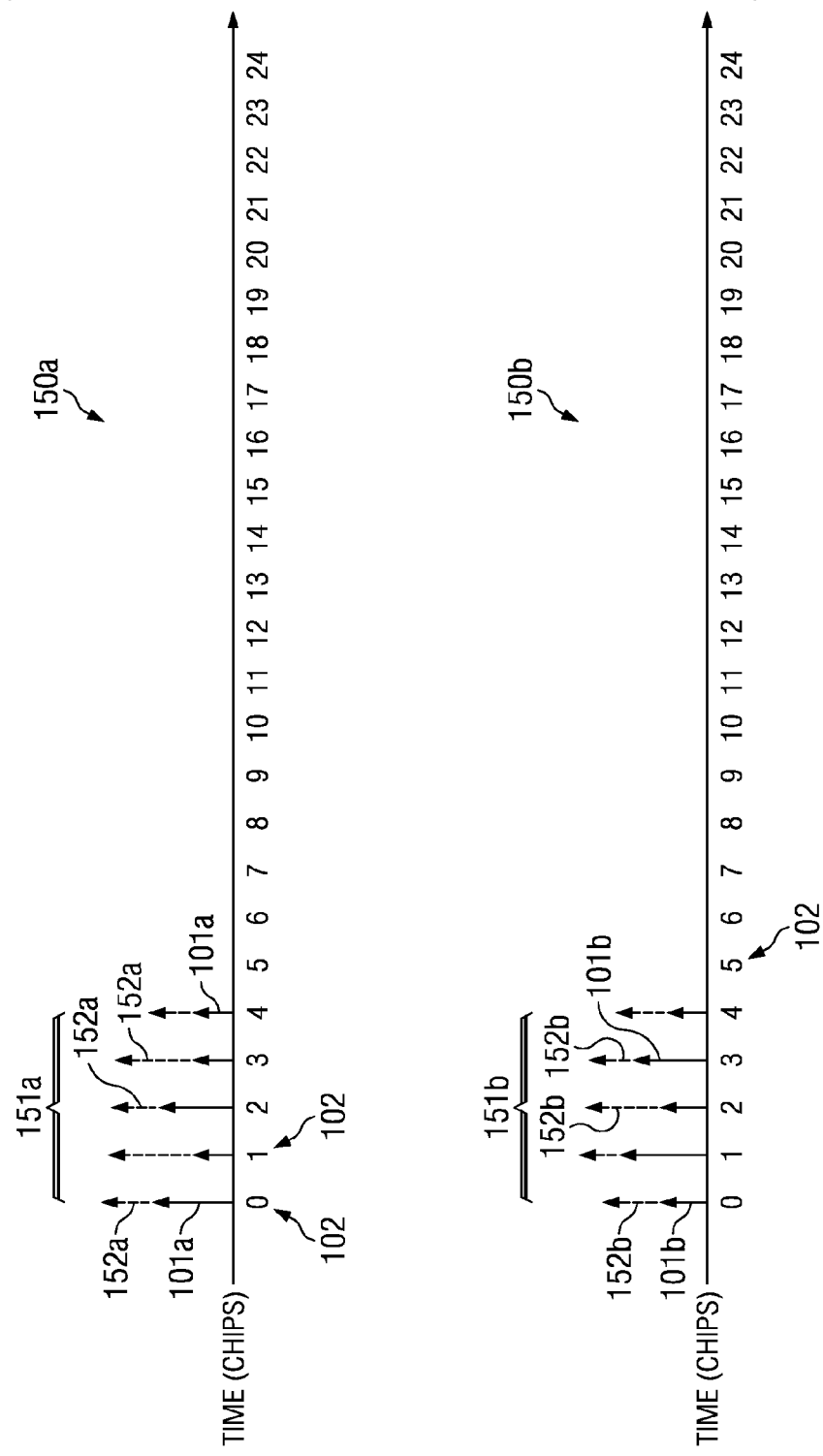

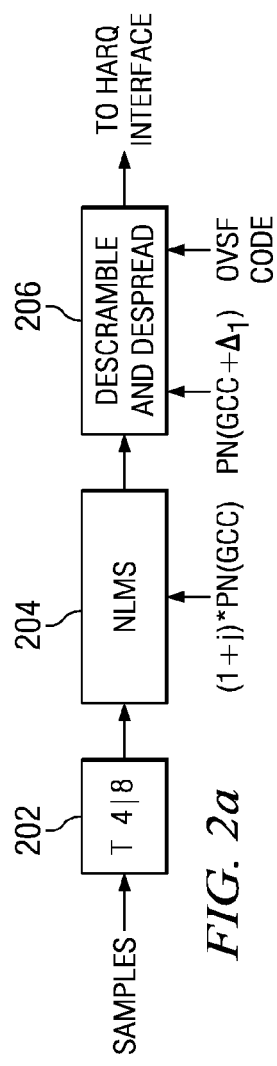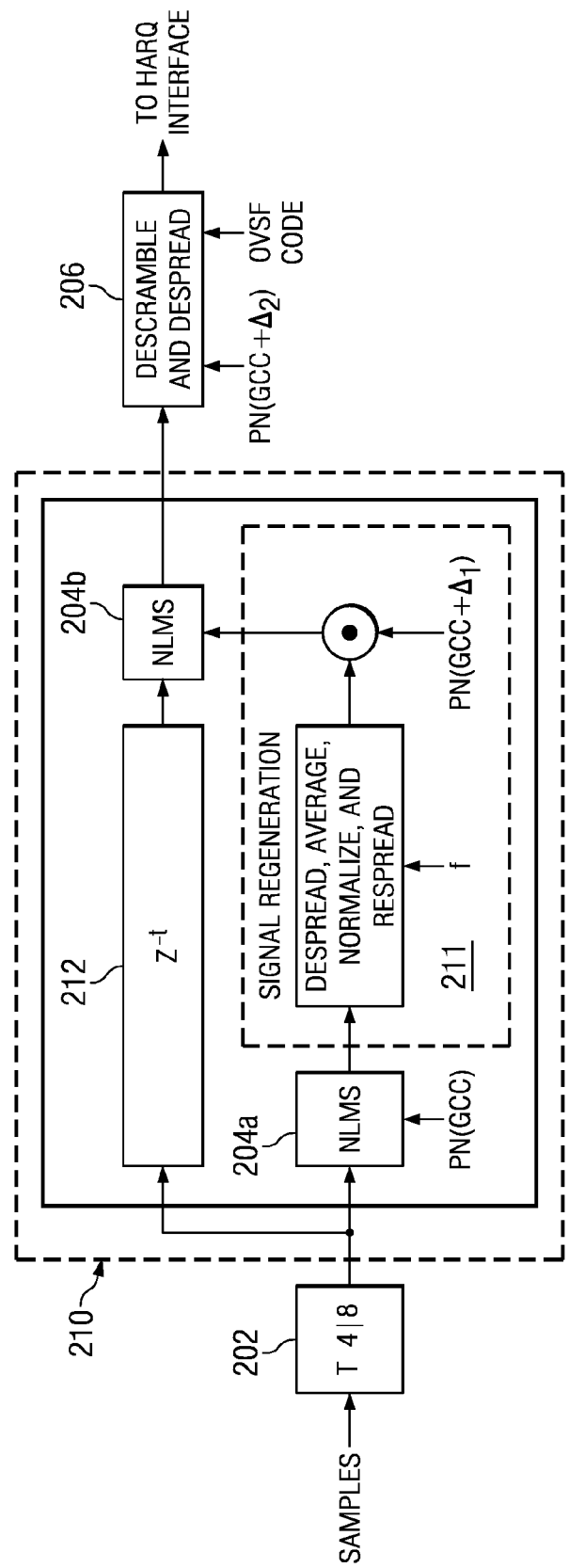

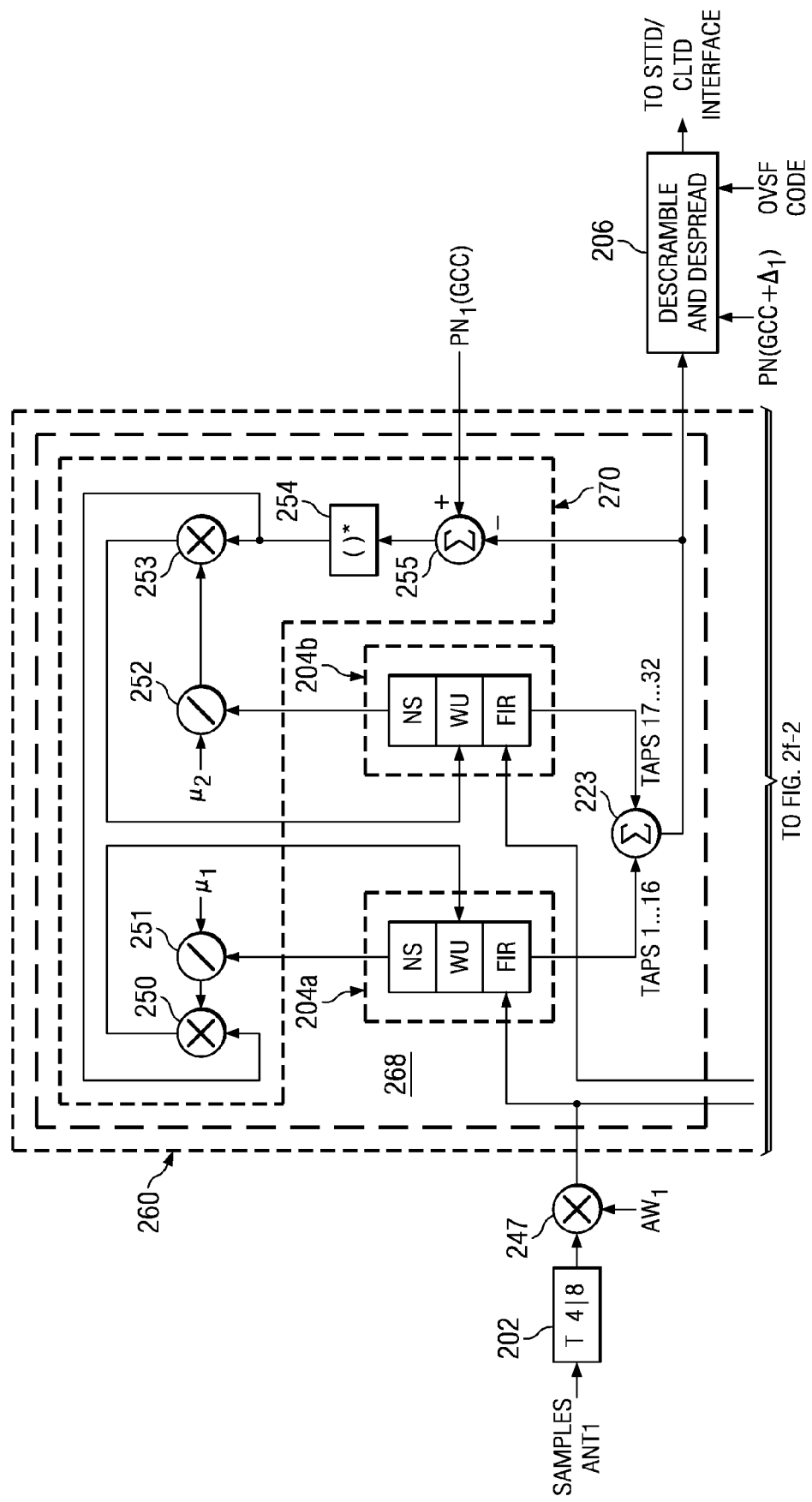

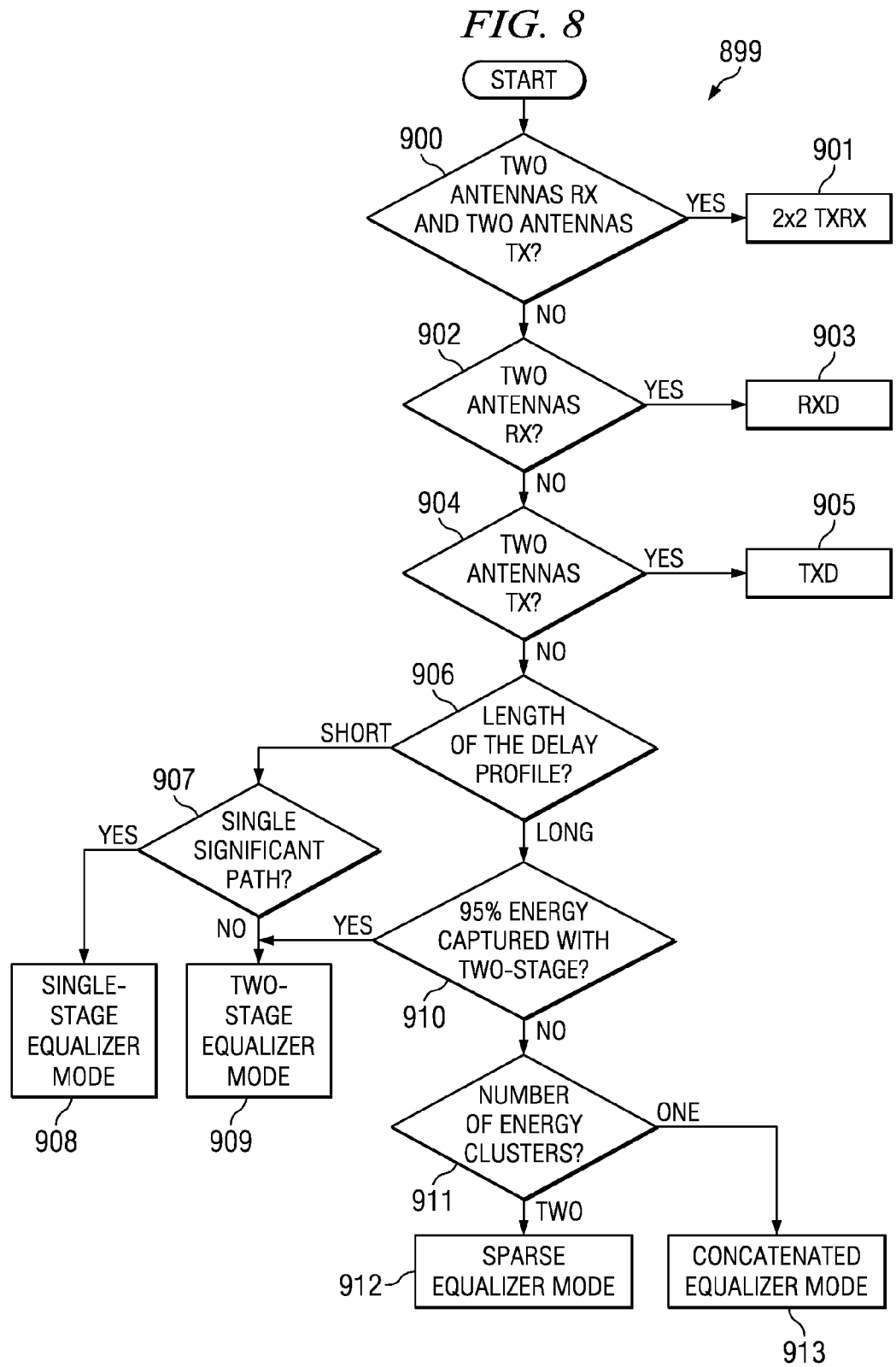

RECONFIGURABLE CHIP LEVEL EQUALIZER ARCHITECTURE FOR MULTIPLE ANTENNA SYSTEMS

CROSS-REFERENCE TO RELATED APPLICATIONS

This application claims priority to U.S. Provisional Application No. 60/567,218, filed Apr. 30, 2004 and entitled "Reconfigurable Chip Level Equalizer Architecture Extensions," incorporated herein by reference.

BACKGROUND

Many wireless communication systems transmit signals between transmitting antennas and receiving antennas. Because transmitting and receiving antennas may be located far apart, a transmitted signal often encounters a variety of mediums en route to a receiving antenna. For example, a transmitted signal may encounter mountains, buildings, and other mediums en route to a receiving antenna. Additionally, many transmitting and receiving antennas are mobile, e.g., cell phone antennas. As a result, a transmitted signal is often divided into a plurality of sub-signals, with each sub-signal having a unique path and time delay, en route to a receiving antenna. The existence of multipath propagation requires special consideration when designing a wireless communication system. For example, at the receiving antenna, the original transmitted signal may be reconstructed by adding the sub-signals together.

In an effort to increase the data rate capacity of wireless communication systems, higher order modulation schemes, e.g., 16 QAM (quadrature amplitude modulation) or 8-PSK (phase shift keying), and spectrally efficient data allocation schemes have been developed. For example, 1x evolution data and voice (1x EV-DV), and high speed downlink packet access (HSDPA) are standards that permit higher data transmission rates through the use of higher order modulation schemes and/or spectrally efficient data allocation schemes.

Using higher order modulation schemes (e.g. 16 QAM, 8-PSK) and spectrally efficient data allocation schemes make wireless communication systems undesirably sensitive to multipath data propagation. In particular, multipath data propagation may cause a loss of signal orthogonality, resulting in data on one channel being more susceptible to interference from other channels, thereby significantly decreasing data throughput of the wireless communication system.

SUMMARY

Accordingly, there is disclosed herein a reconfigurable chip level equalizer having circuitry that restores signal orthogonality and eliminates channel interference for a wireless transmitted signal. An exemplary embodiment may comprise a plurality of adaptive equalizers adapted to couple to a plurality of receive antennas, each of the antennas capable of receiving a multipath delay profile estimate (MDPE), control logic interconnecting at least some of the adaptive equalizers, and a control mechanism that, according to different MDPEs, configures at least some of the adaptive equalizers and control logic.

Another embodiment may comprise at least two antennas, each antenna capable of transmitting or receiving a signal profile, at least two adaptive equalizers coupled to the antennas. The embodiment may further comprise at least one control logic module that interconnects at least two of the adaptive equalizers and a control mechanism that, according to different MDPEs, configures the adaptive equalizers and the at least one control logic module.

Yet another embodiment may comprise determining an attribute of at least one of a plurality of multipath signal profiles, each signal profile received substantially simultaneously by way of a separate antenna, and operating two or more adaptive equalizers according to the attribute of the multipath signal profiles.

BRIEF DESCRIPTION OF THE DRAWINGS

For a detailed description of various embodiments of the invention, reference will now be made to the accompanying drawings in which:

FIG. 1a shows a block diagram illustrating a method of receiving a wireless signal in accordance with embodiments of the invention;

FIGS. 1b-1g show embodiments of multipath delay profile estimates (MDPEs);

FIG. 2a shows a block diagram illustrating a receiving system that uses a single-stage chip level equalizer;

FIG. 2b shows a block diagram illustrating a receiving system that uses a two-stage chip level equalizer;

FIGS. 2f-1 and 2f-2 show a block diagram of a receiving system that contains multiple receive antennas, operates in a transmit and receive diversity mode, and uses a chip level equalizer embodiment with multiple adaptive equalizers, in accordance with embodiments of the invention;

FIG. 8 shows a block diagram illustrating a method of selecting a mode of a reconfigurable chip level equalizer, in accordance with embodiments of the invention.

NOTATION AND NOMENCLATURE

Figure 2C:
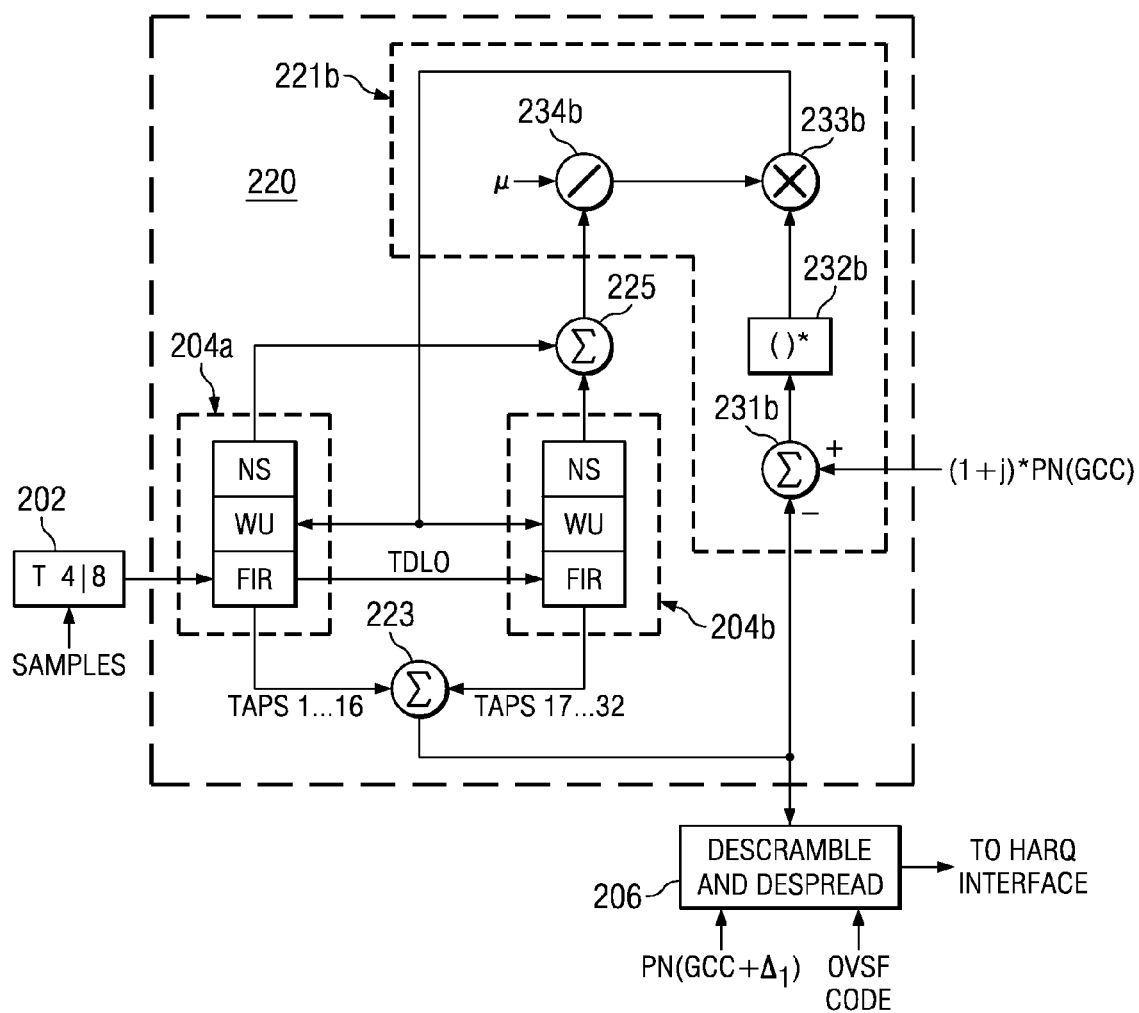
FIG. 2c shows a block diagram illustrating a receiving system that uses a chip level equalizer embodiment with multiple adaptive equalizers to expand a tap delay line of a filter operation to increase the order of the filter.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Typically, a wireless communication system prepares a signal for transmission by modulating the signal. Modulation may comprise a variety of techniques, including frequency modulation, time modulation, and code modulation techniques, that permit a particular signal to be distinguished from other wireless signals. After the signal has been modulated, an antenna may transmit the signal to a receiving antenna.

As previously described, a transmitted signal may arrive at a receiving antenna as a plurality of sub-signals, or reflections. There are at least two techniques to overcome the effects of multipath propagation in high bandwidth systems, such as HSPDA and 1xEV-DV, so that the original signal is restored with minimal distortion (caused by channel interference, etc). One approach is to restore the orthogonality of the transmitted signal using chip level equalization (CLE). CLE uses an adaptive equalizer to track the time varying amplitude and delay characteristics of a channel such that error in the received signal is reduced to a minimum. For more information regarding adaptive equalization, reference may be made to U.S. Pat. No. 6,587,504, entitled "Adaptive Equalizer and designing method thereof", which is incorporated herein by reference.

Another approach to overcome the effects of multipath propagation in high-bandwidth systems may include employing an interference canceler to estimate, regenerate, and cancel interference from other channels. In considering possible embodiments, the CLE may be simpler to implement and more cost effective due to its finite impulse response (FIR) filter structure, while the interference canceler may give better performance. As will be disclosed herein, a configurable chip-level equalizer may be used to provide equalization for a variety of multipath profiles and decoding strategies.

FIG. 1a is a block diagram illustrating a receiving system 800 in which a reconfigurable CLE may implemented. Specifically, the receiving system 800 is illustrative of a HSDPA receiving architecture. As shown in FIG. 1a, the receiving system 800 may comprise a downsampler 802, a CLE 804, a descrambler/despreader 806, a demapper 808, LLR conversion block 810, a Hybrid Automatic Repeat Request (HARQ) 812, and a turbo decoder 814.

As previously explained, the downsampler 802 resamples the input data signal at a lower sampling rate, (e.g., resample every $4^{th}$ or $8^{th}$ input sample) and outputs a signal to the CLE 804. The CLE 804 restores orthogonality by adaptively filtering the received signal and passes the "equalized" signal to descrambler/despreader block 806 which descrambles and despreads the signal from the CLE 804 as previously described. The demap block 808 converts the data to soft symbols. The Log Likelihood Ratio (LLR) block 810 receives the soft symbols from demap block 808 and converts them to LLR format. The process of converting the data to LLR format also saves that data in memory, thereby allowing the HARQ 812 to asynchronously read blocks of data. The combined function of the HARQ 812 and the turbo decoder 814 preferably may be to recognize when errors are present in the received data and request retransmission. Specifically, the HARQ 812 stores data coming from the equalizer, while the function of the turbo decoder 814 is to decode the data. The HARQ 812 and the turbo decoder 814 may request retransmission of data until a combination of old data and new data provide an error free data stream.

FIG. 1b shows a time profile 100 of a multipath signal 103. As shown in FIG. 1b, sub-signals 101 of a multipath signal 103 may vary in amplitude 104 and time of arrival. In particular, FIG. 1b illustrates a multipath delay profile 100 in which the sub-signals 101 arrive in consecutive chip-time units 102. For example, profile 100 may be representative of multipath propagation due to a receiving antenna (e.g., a cell phone antenna) moving slowly (e.g., at speeds less than 10 km/hr).

In order for the CLE to restore orthogonality to a transmitted signal, a number of taps (i.e., computing unit time-spans) are required. The number of taps is computed as:

$$N=2\delta_T+1 \tag{1}$$

where "N" is the number of taps and "$\delta_T$" is the total time interval during which sub-signals 101 with significant energy arrive. For the example of FIG. 1b, $\delta_T=4$ and the required number of taps N=9. FIG. 1c shows a time profile 110 of a multipath signal 103 in which three sub-signals 101 arrive in non-consecutive chip-time units 102. For example, the profile 110 may be representative of multipath propagation due to a receiving antenna moving relatively quickly (e.g., greater than 10 km/hr). The required number of taps N is equal to 9 as in FIG. 1b since $\delta_T$ is again equal to 4. FIG. 1d illustrates a multipath profile 120 in which the sub-signals 101 are spread out over a larger number of chip-time units 102. For example, profile 120 may be representative of multipath propagation due to a receiving antenna which is moving relatively quickly, e.g., greater than 10 km/hr. As shown in FIG. 1d, $\delta_T=12$ and the number of taps N=25. For the multipath signal profile 120 of FIG. 1d, an equalizer with more than twice the number of taps as the equalizers of FIGS. 1b and 1c would be desirable. FIG. 1e illustrates a time profile 130 of a multipath signal 103 wherein two clusters 105 of sub-signals 101 are separated by a number of chip-time units 102. For example, profile 130 may be representative of multipath propagation due to a receiving antenna being used in hilly or mountainous terrain. In the example of FIG. 1e, two equalizers may be used and their responses combined in order to account for the delay 106 between the two clusters 105.

FIG. 1f illustrates two time profiles 140a and 140b comprising signal clusters 141a, 141b, respectively. In turn, the signal clusters 141a, 141b may comprise multiple sub-signals 101a, 101b, respectively, that arrive in consecutive chip-time units 102. The sub-signals 101a, 101b are transmitted by way of a single antenna but are received by two separate antennas. Each of the time profiles represents signals received by a different receive antenna. For this reason, time profiles 140a, 140b are shown in parallel with each other. Although the sub-signals 101 are transmitted from the same antenna, the sub-signals may take separate paths to the two receiving antennas. Thus, the sub-signals in profile 140a may be at least somewhat different in magnitude from the sub-signals in profile 140*b*. In the example of FIG. 1*f*, two equalizers may be used, each equalizer receiving a signal from a different receive antenna.

FIG. 1*g* illustrates two time profiles 150*a* and 150*b* comprising signal clusters 151*a*, 151*b*, respectively. In turn, the signal clusters 151*a*, 151*b* may comprise multiple sub-signals 101*a*, 101*b*, respectively, that arrive in consecutive chip-time units 102. The sub-signals 101*a*, 101*b* may have additional sub-signals 152*a*, 152*b*, respectively appended thereto. The sub-signals are transmitted by way of two separate antennas and received by way of two separate antennas. Each of the profiles represents signals received by a different antenna. Furthermore, the presence of multiple sub-signals (e.g., sub-signals 101*a*, 152*a*) indicates transmission by two separate antennas.

The profiles 100, 110, 120, 130, 140*a*, 140*b*, 150*a* and 150*b* of FIGS. 1*b*-1*g* illustrate a variety of possible multipath delay profile estimates (MDPEs). Some embodiments of the invention comprise a configurable CLE that may use multiple modes to adjust dynamically to different MDPEs, such as those illustrated by FIGS. 1*b*-1*g*. As will be described below, a reconfigurable chip level equalizer (CLE) may use Normalized Least-Mean-Square (NLMS) adaptive algorithms to minimize any error to the transmitted signal caused by changes in a transmission channel. However, embodiments of the reconfigurable CLE are not limited to NLMS equalization and other adaptive algorithms (e.g. Least-Mean-Square (LMS), Griffith's, constrained-response minimum output energy (CRMOE), pre-filter rake, linear minimum squared error (LMMSE), and others) may be implemented in some embodiments instead of the NLMS algorithms.

FIG. 2*a* shows a block diagram illustrating a receiving system that uses a single-stage chip level equalizer 204. As shown in FIG. 2*a*, a single-stage chip level equalizer 204 may be coupled between a downsampler 202, and a descrambler/despreader block 206. Digitized samples of a received wireless signal are input to the downsampler 202, which may resample the input at a lower sampling rate, (e.g., resample every $4^{th}$ or $8^{th}$ input sample). In some embodiments, a downsampler 202 may not be necessary if the digital data samples are transferred at a rate compatible with the equalizer 204. The downsampler 202 outputs a downsampled version of the received signal to the NLMS equalizer 204. The equalizer 204 may adaptively filter the input using a finite impulse response (FIR) filter. An FIR filter may include one or more delay taps that determine the length of the filter, wherein each tap has an associated weight coefficient that correspond to an impulse response.

To accomplish the adaptive filtering, equalizer 204 may update the filter tap weights of the FIR filter so that channel induced error is sufficiently reduced. To update the filter tap weights, equalizer 204 preferably calculates a "norm" square by squaring the values stored at each FIR tap delay and adding them together. The norm square value is divided (i.e., normalized) by an adjustable adaptation coefficient and the result is multiplied by a signal error approximation which may be obtained by subtracting the FIR output from a desired signal. The result of the multiplication may be used to replace the previous filter tap weights of the FIR, thereby allowing the equalizer to adjust to changes in a transmission channel as previously described.

In at least some embodiments, the desired signal mentioned above may comprise a pilot signal provided by any suitable standard (e.g., wide band code division multiple access (WCDMA)). As shown in FIG. 2*a*, a signal "(1+j)*PN (GCC)" may be input to the NLMS equalizer 204 as the pilot signal, where (1+j) represents a constant magnitude pilot in both I and Q components of the pilot, PN is a pseudo-random sequence, and GCC denotes the offset in the sequence. As previously mentioned, the receiving system uses the single-stage equalizer 204 to track changes in a wireless communication channel and minimize interference, e.g. intersymbol interference (ISI), caused by those changes. The GCC (not shown) enables synchronization between the equalizer 204 and other components, e.g., the descrambler/despreader block 206. In at least some embodiments, the signal-stage equalizer 204 may be used with MDPEs similar to that shown in FIG. 1*b*, wherein multipath sub-signals arrive in consecutive chip-time units.

The output from the NLMS equalizer 204 may be input to the descrambler/despreader block 206. The descrambler/despreader block 206 preferably multiplies the input by the complex conjugate of the PN sequence "PN(GCC+$\Delta_1$)" to descramble the data. The data may then be despread using orthogonal variable spreading factor (OVSF) codes which are input to the descrambler/despreader block 206. A time delay "$\Delta_1$" may be added to the GCC timing for the descrambler/despreader block 206 to account for the delay of the NLMS equalizer 204.

FIG. 2*b* illustrates a receiving system that uses a two-stage chip level equalizer 210. As shown in FIG. 2*b*, a two-stage chip level equalizer 210 may be coupled between a downsampler 202, and a descrambler/despreader block 206. As shown, digitized samples of a received wireless signal are input to the downsampler 202, which resamples the input at a lower sampling rate (e.g., resample every $4^{th}$ or $8^{th}$ input sample). The downsampler 202 outputs a signal to NLMS equalizer 204*a* and a delay line 212. Again, the NLMS equalizer filters the input using a FIR filter and updates the filter tap weights (weight coefficients) as described above.

The output of equalizer 204*a* is received by signal regeneration block 211, which despreads, averages, normalizes, respreads, and multiplies the equalizer 204*a* output by pilot signal "PN(GCC+$\Delta_1$)". Again, "$\Delta_1$" is a delay related to equalizer 204*a* and to regeneration block 211 that is added to the GCC to synchronize the timing between equalizer 204*a* and other components, e.g., signal regeneration block 211. The output of signal regeneration block 211 is used as the desired signal, or training signal, for NLMS equalizer 204*b*. It is noted that the delay provided by delay line 212 preferably synchronizes the operation of equalizer 204*b* with the operation of equalizer 204*a* and signal regeneration block 211. The NLMS adaptive equalizer 204*b* receives the delayed original signal from delay line 212, and performs FIR filtering and filter tap weight updating functions as previously described using the output of signal regeneration block 211 as a training signal.

Implementing the two-stage CLE 210 in a receiving system allows improved channel tracking accuracy and speed compared to the single-stage CLE 200. This is because equalizer 204*b* uses a "trained" pilot signal (i.e., the output of signal regeneration block 211 provides a more accurate training signal for equalizer 204*b* than would a standard PN sequence). The equalizers 204*a* and 204*b* of FIG. 2*b* may each have their own computation resources (not shown), which are used for updating weight coefficients (filter tap weights) as previously described. In at least some embodiments, the two-stage CLE 210 may be used with MDPEs similar to those shown in FIGS. 1*b* and 1*c*. In some embodiments the two-stage CLE 210 may be used as a "default" configuration.

As previously described for the signal-stage CLE 204, the output from the two-stage CLE 210 may be input to a descrambler/despreader block 206. The descrambler/despreader block 206 multiplies the input by the conjugate of the PN sequence "PN(GCC+$\Delta_2$)" to descramble the data. The data may then be despread using orthogonal variable spreading factor (OVSF) codes which are input to the descrambler/despreader block 206. Time delay "$\Delta_2$" may be added to the GCC timing for the descrambler/despreader block 206 to account for the delay of equalizer 204a, signal regeneration delay, delay line 212, and/or equalizer 204b.

FIG. 2c shows a block diagram illustrating a receiving system that uses an embodiment of a "concatenated" CLE 220 having multiple adaptive equalizers. As shown in FIG. 2c, two partial NLMS equalizers 204a and 204b may be placed in series, thereby effectively extending the tap delay line. In at least some embodiments, the concatenated CLE 220 may be used with MDPEs similar to that shown in FIG. 1d, wherein the multipath sub-signals are spread over a large number of chip-time units.

As shown in FIG. 2c, the concatenated CLE 220 may be coupled to a downsampler 202, wherein digitized samples of a received wireless signal are input to the downsampler 202, which resamples the input at a lower sampling rate, (e.g., resample every $4^{th}$ or $8^{th}$ input sample). The downsampler 202 outputs a signal to adaptive equalizer 204a, which performs FIR filtering, norm square computation, and weight update functions as previously described.

As shown in FIG. 2c, the calculation resource 221b of adaptive equalizer 204b is used by both equalizers 204a and 204b to update the filter tap weights. The calculation resource 221b, as shown, generally requires that NLMS equalizers 204a and 204b be modified from a "standard" equalizer configuration in which an equalizer uses its own calculation resources (e.g., the NLMS equalizers shown in FIGS. 2a and 2b would each use their own calculation resources). In the embodiment of FIG. 2c, sharing calculation resource 221b would conserve more power than other embodiments, which may implement the calculation resources of equalizers 204a and 204b.

As shown, the concatenated CLE 220 combines the norm squares of equalizers 204a and 204b using a summer 225 and provides the norm square sum to calculation resource 221b (the calculation resource of equalizer 204b) which performs the steps of comparing the FIR output to a desired pilot signal "(1+j)*PN(GCC)", normalizing the norm square sum, and updating the weights coefficients for both equalizers 204a and 204b. As previously mentioned, using one calculation resource 221b for both equalizers 204a and 204b allows the calculation resource of the other equalizer to be temporarily disabled, thereby saving power.

In at least some embodiments, the calculation resource 221b may comprise a divider 234b, a multiplier 233b, a conjugate block 232b, and a subtracter 231b. As shown in FIG. 2c, the divider 234b divides the norm square sum by an adaptation coefficient "µ". The multiplier 233b multiples the output of the divider 234b by the conjugated difference (obtained by subtracting) between the pilot signal and the combined FIR outputs of equalizers 204a and 204b. As shown in FIG. 2c, summer 223 combines the FIR outputs of equalizers 204a and 204b, whereby subtracter 231b subtracts the summed FIR outputs from pilot signal "(1+j)*PN(GCC)". The subtraction result is conjugated by conjugate block 232b, which provides that conjugated signal to multiplier 233b as described above.

As shown in FIG. 2c, equalizer 204a may provide delay taps 1 to N of an FIR filter with tap length 2N and equalizer 204b may provide delay taps N+1 to 2N of the 2N tap FIR filter used for the concatenated CLE 220, such that, in at least some embodiments, each equalizer provides N taps. As previously explained, the concatenated CLE 220 may preferably be used when a MDPE is similar to that shown in FIG. 1d, wherein the multipath sub-signals are spread out over many chip-time units. The output of concatenated CLE 220 may be descrambled and despread by descrambler/despreader block 206 as previously described.

Figure 2D:
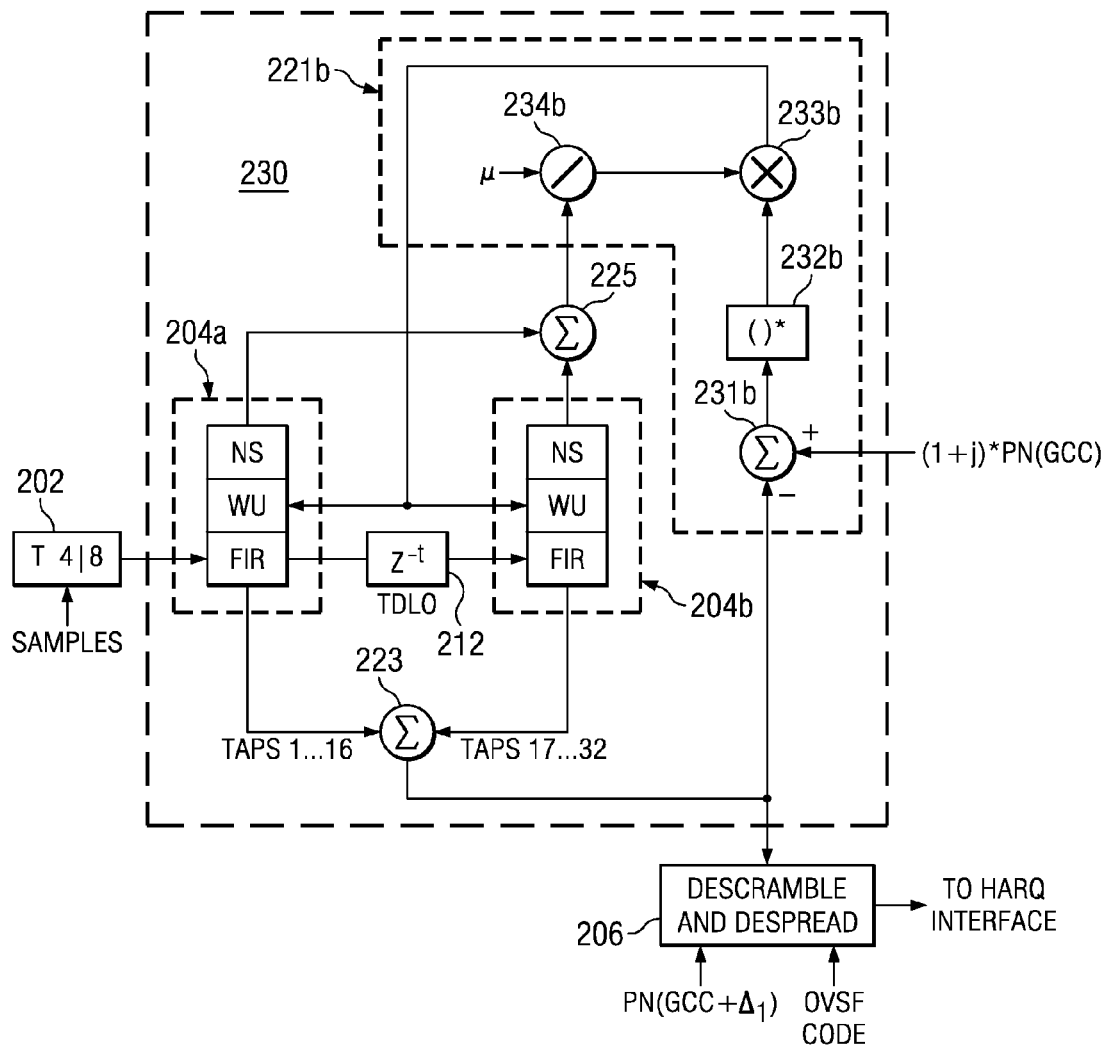
FIG. 2d shows a block diagram illustrating a receiving system that uses a chip level equalizer with multiple adaptive equalizers that can be used to filter two or more separate energy clusters.

FIG. 2d shows a block diagram illustrating a receiving system that uses an embodiment of a "sparse" CLE 230 that uses multiple adaptive equalizers. As shown in FIG. 2d, two NLMS equalizers 204a and 204b may be placed in series, separated by a delay line 512 that allows equalization of two clusters separated in time. In a preferred embodiment, the sparse CLE 230 may be used with MDPEs similar to that shown in FIG. 1e, wherein two clusters of multipath sub-signals are separated by a large number of chip-time units.

As shown in FIG. 2d, the sparse CLE 230 may be coupled to a downsampler 202, which resamples the input at a lower sampling rate, (e.g., resample every $4^{th}$ or $8^{th}$ input sample). The downsampler 202 outputs a downsampled received signal to adaptive equalizer 204a, which performs FIR filtering, norm square computation, and weight coefficient update functions as previously described.

The operation of the sparse CLE 230 is generally identical to the operation of the concatenated CLE 220, with the exception that a delay line 212 is placed between a tap delay output of equalizer 204a and a FIR filter input of equalizer 204b. By placing delay line 212 between the tap delay output of equalizer 204a and the FIR input of equalizer 204b, the sparse CLE 230 may be used to handle MDPEs in which a large delay separates clusters of multipath sub-signals as was described for FIG. 1e. As shown in FIG. 2d, equalizer 204a may handle taps 1 to N and equalizer 204b may handle taps N+1 to 2N for the sparse CLE 230. As previously explained for other CLE embodiments, the output of sparse CLE 230 may be descrambled and despread using a descrambler/despreader block 206.

Figure 2E:
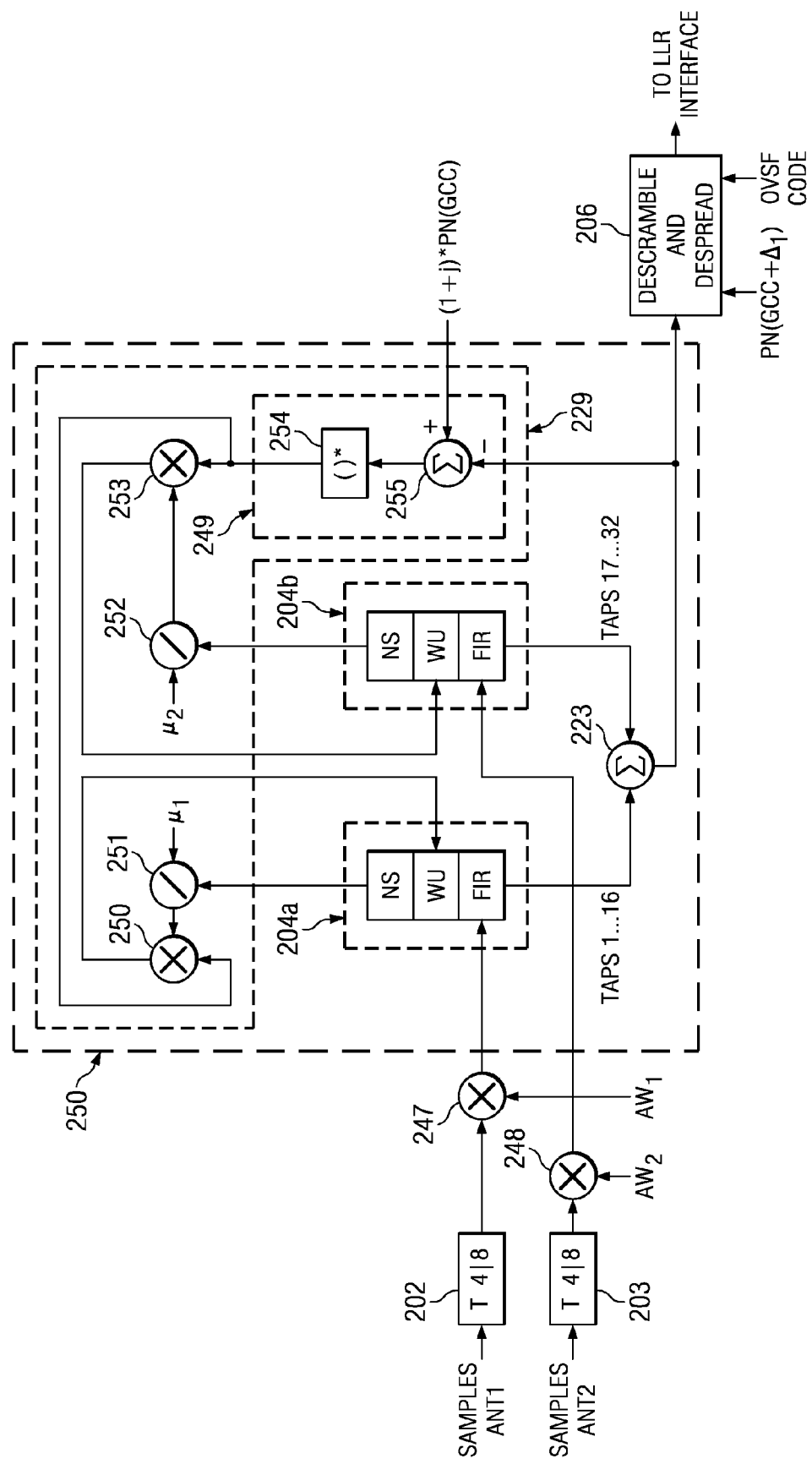
FIG. 2e shows a block diagram of a receiving system that contains multiple receive antennas, operates in a receive diversity mode, and uses a chip level equalizer embodiment with multiple adaptive equalizers, in accordance with embodiments of the invention.

FIG. 2e shows a block diagram illustrating a receiving system that uses an embodiment of a "receive diversity" (RxD) CLE 250 having multiple adaptive equalizers. As shown in FIG. 2e, each of two partial NLMS equalizers 204a and 204b have an independent input and the outputs of both equalizers are combined to generate a common error that will be used to train each equalizer. In at least some embodiments, the RxD CLE 250 may be used with MDPEs similar to that shown in FIG. 1f, wherein the multipath signals are received in parallel.

As shown in FIG. 2e, the RxD CLE 250 may be coupled to multiple downsamplers 202, 203, wherein digitized samples of a received wireless signal are input to the downsamplers 202, 203, which resample the inputs at a lower sampling rate (e.g., resample every $4^{th}$ or $8^{th}$ input sample). The downsamplers 202, 203 output signals to multipliers 247, 248, whereby the signals are combined with antenna weights associated with antennas (not shown) coupled to each of the downsamplers 202, 203. The antenna weights control the amount of energy combined by each equalizer, because in some cases, one antenna may not have a suitable strength level and after being amplified by an automatic gain control, the signal may contain excessive amounts of noise.

The output signals of the multipliers 247, 248 then are input into adaptive equalizers 204a, 204b, respectively. The equalizers 204a, 204b perform FIR filtering, norm square computation, and weight update functions as previously described.

As shown in FIG. 2e, the calculation resource 229 is used by both equalizers 204a, 204b to update the filter tap weights. The calculation resource 229, as shown, generally requires that NLMS equalizers 204a, 204b be modified from a "standard" equalizer configuration in which an equalizer uses its own calculation resources (e.g., the NLMS equalizers shown in FIGS. 2a and 2b would each use their own calculation resources). In the embodiment of FIG. 2e, sharing calculation resource 229 would conserve more power than other embodiments, which may implement the calculation resources of equalizers 204a, 204b.

In at least some embodiments, the calculation resource 229 may comprise dividers 251, 252, multipliers 250, 253, and a calculation resource 249 which, in turn, comprises a conjugate block 254 and a subtracter 255. As shown in FIG. 2e, the dividers 251, 252 divide the norm square sums of the equalizers 204a, 204b by adaptation coefficients "$\mu_1$" and "$\mu_2$," respectively. The multiplier 253 multiplies the output of the divider 252 by the conjugated difference (obtained by subtracting) between the pilot signal and the combined FIR outputs of equalizers 204a and 204b. More specifically, the summer 223 combines the FIR outputs of the equalizers 204a, 204b, and provides the result to the subtracter 255, whereby the subtracter 255 subtracts the summed FIR outputs from the pilot signal "(1+j)*PN(GCC)," as previously described. The subtraction result is conjugated by conjugate block 254, which provides that conjugated signal to multipliers 250 and 253, as described above. The output of the multiplier 253 is provided to the equalizer 204b, whereby the filter tap weights are updated. The output of the multiplier 250 is then routed to the equalizer 204a, whereby the filter tap weight of the equalizer 204a is updated.

As shown in FIG. 2e, equalizer 204a may provide delay taps 1 to N of its FIR filter (i.e., a total of N taps). Equalizer 204b may provide its own delay taps N+1 to 2N of the FIR filter used for the RxD CLE 250 (i.e., a total of N taps). As previously explained, the RxD CLE 250 may preferably be used when a MDPE is similar to that shown in FIG. 1f. In at least some embodiments, the MDPE is obtained at the receiver by using two antennas that differ slightly in their position and thus each receive a single multipath from a slightly different position. The output of RxD CLE 250 may be descrambled and despread by descrambler/despreader block 206, as previously described.

Figures 2, 2F:
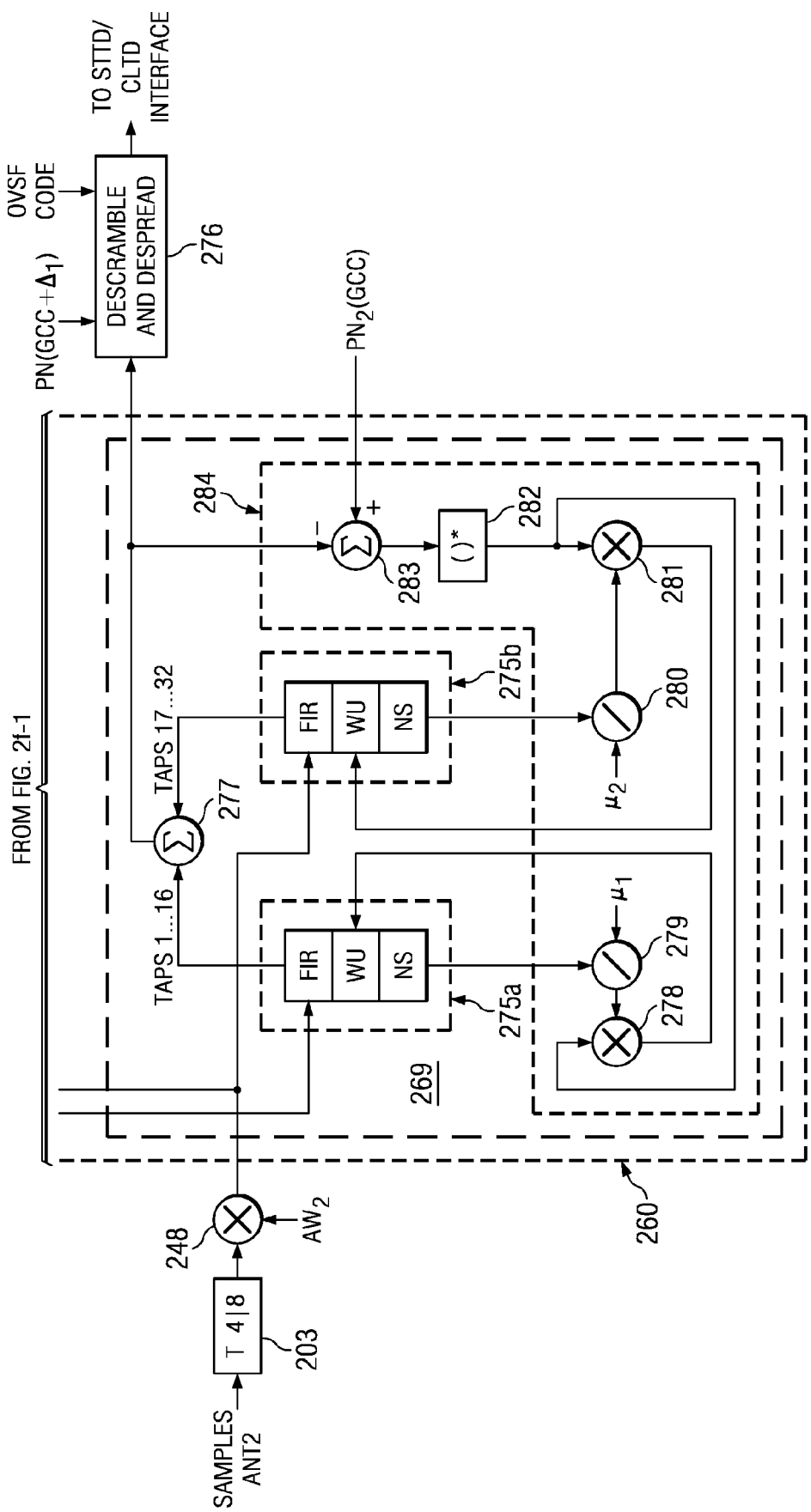

FIGS. 2f-1 and 2f-2 show a block diagram of a receiving system that uses an embodiment of a transmit diversity/receive diversity (2×2 TX/RX) CLE 260 that uses multiple adaptive equalizers. As shown in the figures, four NLMS equalizers 204a, 204b, 275a and 275b are incorporated into the CLE 260. The equalizers 204a, 204b are coupled to calculation resource 270. The equalizers 275a, 275b are coupled to calculation resource 284. The equalizers 204a, 204b and calculation resource 270 are substantially similar to the equalizers 204a, 204b and calculation resource 229 of FIG. 2e. The equalizers 275a, 275b and calculation resource 284 also are substantially similar to the equalizers 204a, 204b and calculation resource 229 of FIG. 2e. Thus, the CLE 260 of FIGS. 2f-1 and 2f-2 essentially comprises two replications 268, 269 of the CLE 250 in FIG. 2e. Each of the replications 268, 269 functions substantially similarly to the CLE 250 in FIG. 2e. The equalizers 204a, 275a of replications 268, 269, respectively, each receive an input signal by way of an antenna (not shown). The signals are processed by downsampler 202 as previously described, and multiplied by an antenna weight in multiplier 247. Similarly, the equalizers 204b, 275b of replications 268, 269, respectively, each receive an input signal by way of a second antenna. The signals then are processed by downsampler 203 as previously described, and multiplied by an antenna weight in multiplier 248. The outputs of each of the replications 268, 269 may be descrambled and despread by descrambler/despreader blocks 206, 276, respectively, as previously described. Because only two equalizers are available in this embodiment, resource sharing may be employed.

Figure 3:
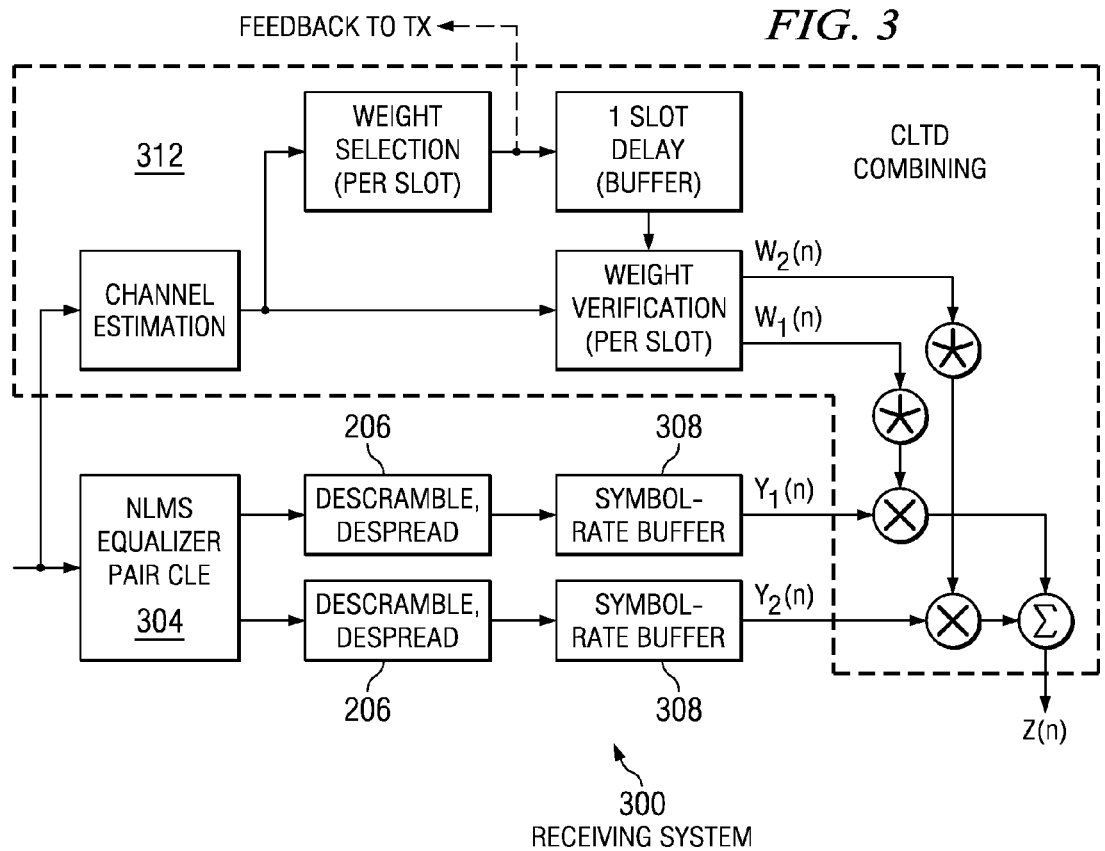
FIG. 3 shows a block diagram illustrating an embodiment of a closed-loop transmit diversity (CLTD) equalizer.

FIG. 3 is a block diagram illustrating a receiving system 300 that uses closed-loop transmit diversity (CLTD) equalization. As shown in FIG. 3, the receiving system 300 may comprise a single-stage equalizer pair 304, descrambler/despreader blocks 206, symbol-rate buffers 308, and CLTD decode block 312. The single-stage equalizer pair CLE 304 may receive a downsampled input signal as previously described for other receiving systems. The single-stage equalizer pair 304 may operate as two separate NLMS equalizers (e.g., equalizer 204 of FIG. 2a) preferably to support wireless systems that use multiple antennas for transmitting and one antenna for receiving. The received signal is input also to CLTD decode block 312, which functions according to CLTD standards. The outputs of the NLMS equalizer pair 304 may be descrambled and despread by descrambler/despreader blocks 206 and forwarded to symbol-rate buffers 308 which synchronize the combination of the descrambled/despread equalizer outputs $Y_1(n)$ and $Y_2(n)$ with the calculation of CLTD weight estimates $W_1(n)$ and $W_2(n)$. In particular, the receiving system 300 may be used when multiple antennas are used to transmit a wireless signal.

Figure 4:
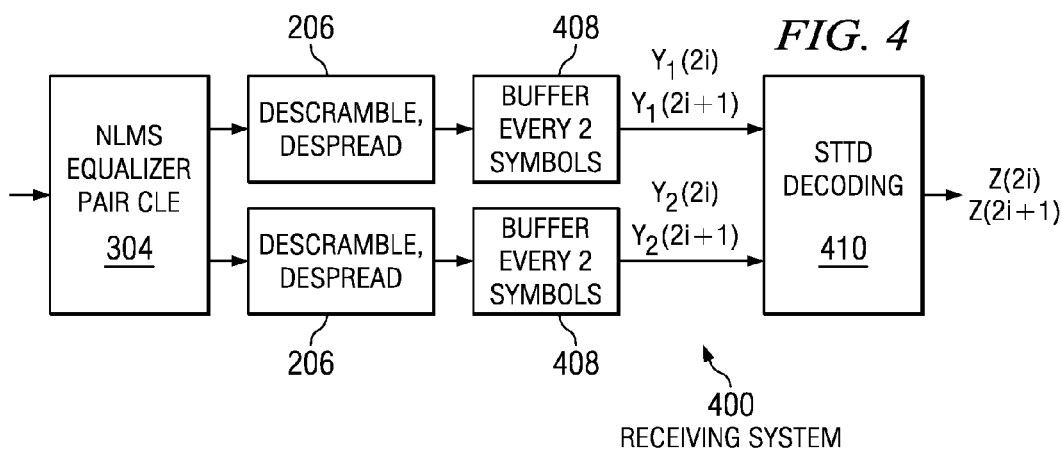
FIG. 4 shows a block diagram illustrating an embodiment of a space-time transmit diversity (STTD) equalizer.

FIG. 4 shows a block diagram illustrating a receiving system 400 that uses space-time transmit diversity (STTD) equalization. As shown in FIG. 4, the system 400 may comprise a single-stage equalizer pair CLE 304, descrambler/despreader blocks 206, buffer blocks 408, and STTD decoding block 410. The single-stage equalizer pair CLE 304 (e.g. two NLMS equalizers) receives a downsampled input signal as previously described for other receiving systems. The output of the equalizer pair block 304 may be descrambled and despread using the descrambler/despreader blocks 406, buffered every two symbols using buffer blocks 408, and decoded according to the STTD standard using STTD decoding block 410. In particular, the receiving system 400 may be used when multiple antennas are used to transmit a wireless signal.

In accordance with embodiments of the present invention, a reconfigurable chip level equalizer may perform the functions of the equalizers of FIGS. 2a-2d, FIG. 3, and FIG. 4. In at least some embodiments, a reconfigurable chip level equalizer may comprise two or more adaptive equalizers, a plurality of operational blocks that interconnect the two or more adaptive equalizers, and a control mechanism that configures the two or more adaptive equalizers and operational blocks according to the different MDPEs. In response to at least one MDPE, the reconfigurable chip level equalizer may be configured to operate using only one equalizer.

Figure 5:
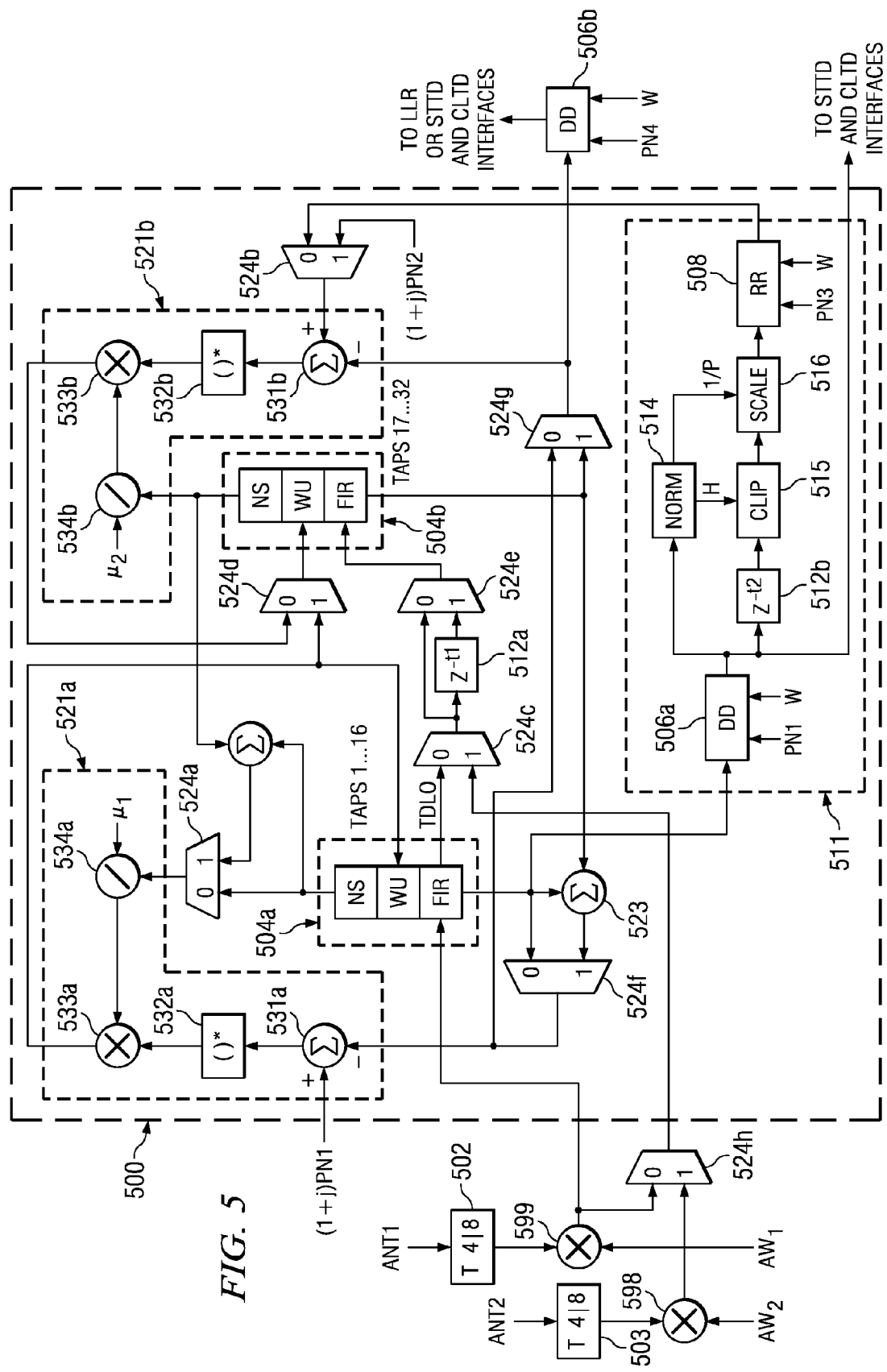
FIG. 5 shows a block diagram illustrating a reconfigurable chip level equalizer in accordance with embodiments of the invention.

FIG. 5 is a block diagram illustrating a reconfigurable chip level equalizer 500 in accordance with embodiments of the present invention. As shown in FIG. 5, the reconfigurable CLE 500 may comprise adaptive equalizer blocks 504a and 504b coupled to each other and to computational resources 521a and 521b through multiplexers 524a-524h. The computational blocks 521a and 521b may comprise subtract blocks 531a and 531b, conjugate blocks 532a and 532b, multiplication blocks 533a and 533b, and division blocks 534a and 534b. The reconfigurable CLE 500 may also comprise a plurality of operational blocks, such as a signal regeneration block 511, coupled to one of the adaptive equalizer blocks 504. As shown in FIG. 5, the signal regeneration block 511 may comprise a descrambler/despreader block 506a, a delay line 512b, a normalization block 514, a clipping block 515, a scaling block 516, and a rescrambler/respreader block 508. As shown, the reconfigurable CLE 500 may also comprise a delay line 512a coupled between equalizers 504a and 504b through multiplexers 524c and 524e. Data sample signals are input by way of antenna 1 (ANT1) and antenna 2 (ANT2). Samples from ANT1 are downsampled by downsampler 502, weighted by multiplication block 599 using an antenna weight AW1, and then processed further by the CLE 500. Likewise, samples from ANT2 are downsampled by downsampler 503, weighted by multiplication block 598 using antenna weight AW2, and subsequently processed further by the CLE 500.

As shown in FIG. 5, a number of pilot signals (PN1-PN4) may be used as a pseudo random number sequence. PN1-PN4 define delayed versions of PN. In at least some embodiments, it may be possible that each transmission antenna has a different PN sequence. The pilot signals may be used by various components of the reconfigurable CLE 500. Specifically, in some embodiments, subtracter 531a and descrambler/despreader 506a may receive a pilot signal PN1, subtracter 531b may receive a pilot signal PN2, rescrambler/respreader 508 may receive a pilot signal PN3, and descrambler/despreader 506b may receive a pilot signal PN4. In some embodiments, PN2, PN3 and PN4 may be time-shifted versions of PN1.

In at least some embodiments, the multiplexers 524a-524g allow the reconfigurable chip level equalizer 500 to operate in a plurality of modes corresponding to characteristics (attributes) of a received MDPE and/or transmission modes. More specifically, controlling multiplexers 524a-524g allow the reconfigurable CLE 500 to be used as a single-stage CLE 200 (FIG. 2a), a two-stage CLE 210 (FIG. 2b), a concatenated CLE 220 (FIG. 2c), a sparse CLE 230 (FIG. 2d), a receive diversity CLE 250 (FIG. 2e) and single-stage equalizer pair CLE 304 (FIGS. 3 and 4). In at least some embodiments, the reconfigurable CLE 500 may function according to Table 1 as shown below.

TABLE 1

|  | Mux0 524a | Mux1 524f | Mux2 524g | Mux3 524b | Mux4 524c | Mux5 524d | Mux6 524e | Mux7 524h |
|---|---|---|---|---|---|---|---|---|
| Single-Stage CLE | 0 | 0 | 0 | X | X | X | X | X |
| Two-Stage CLE | 0 | 0 | 1 | 0 | 1 | 0 | 1 | 0 |
| Concatenated CLE | 1 | 1 | 0 | X | 0 | 1 | 0 | X |
| Sparse CLE | 1 | 1 | 0 | X | 0 | 1 | 1 | X |
| Transmit Diversity | 0 | 0 | 1 | 1 | 1 | 0 | 0 | 0 |
| Receive Diversity | 0 | 1 | 0 | 1 | 1 | 0 | 0 | 1 |

As shown in Table 1, the reconfigurable CLE 500 functions as a single-stage CLE 200 when multiplexer (mux) 524a is set to input 0, mux 524b is irrelevant ("X"), mux 524c is irrelevant, mux 524d is irrelevant, mux 524e is irrelevant, mux 524f is set to input 0, mux 524g is set to input 0, and mux 524h is irrelevant. Similarly, other operating modes may be activated by setting multiplexers 524a-524h to their corresponding settings (i.e., input 0, input 1, or irrelevant) as shown, for example, in Table 1.

In order to select the most appropriate equalization mode of reconfigurable CLE 500, several parameters may be considered, such as the delay time spread of the channel, the received power, the number of receive and transmit antennas, the target power consumption, and the maximum separation between multipath clusters. In a preferred embodiment, the reconfigurable CLE 500 may automatically change modes in response to changes in the above mentioned parameters or other related parameters.

Figure 6A:
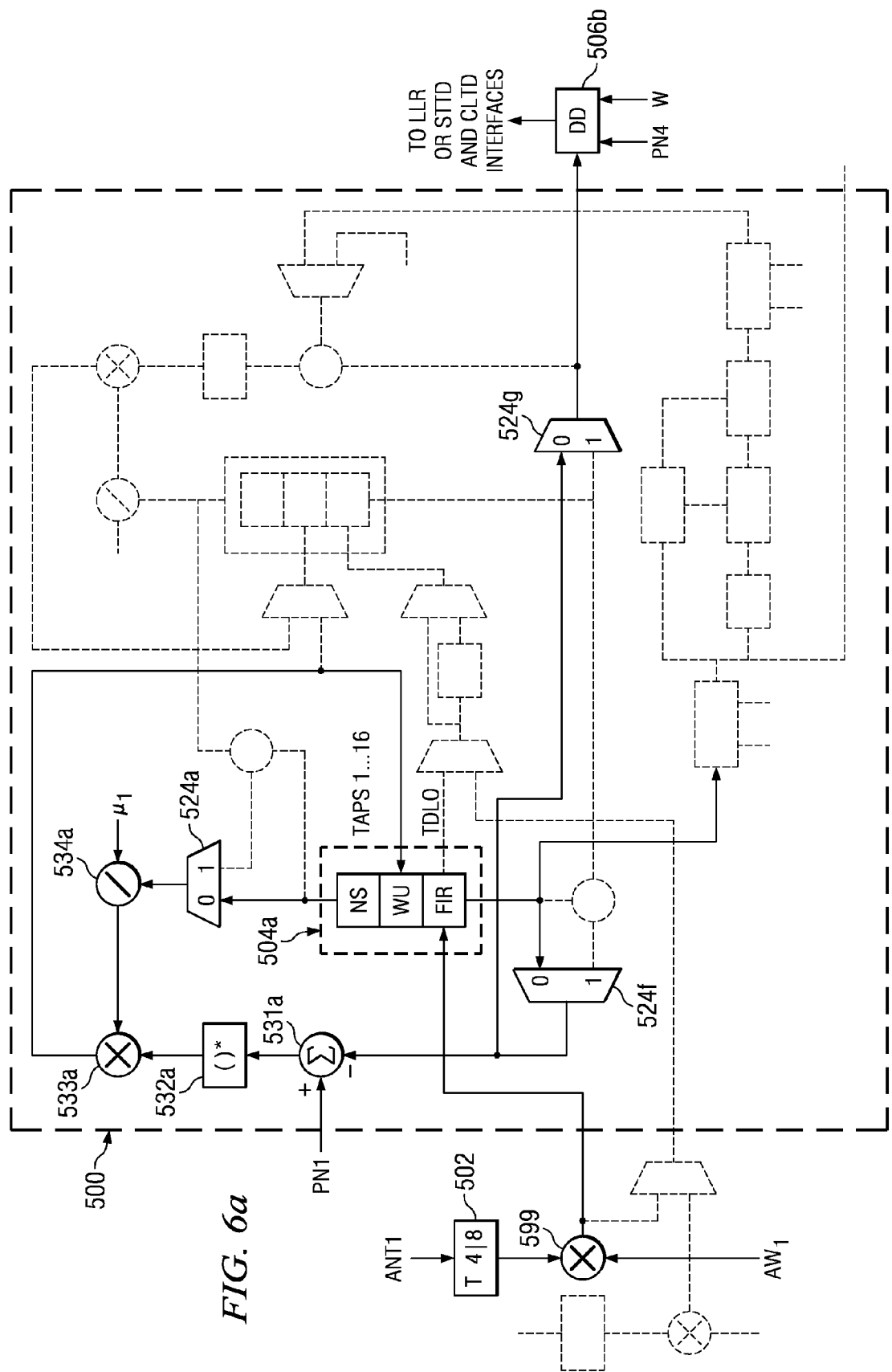
FIGS. 6a-6e show various operating modes of the reconfigurable chip level equalizer illustrated in FIG. 5 in accordance with embodiments of the invention.

FIG. 6a is a block diagram illustrating an embodiment of the reconfigurable CLE 500 of FIG. 5 in a single-stage configuration. As shown, bold line portions of the reconfigurable CLE 500 are preferably enabled during the single-stage configuration. In the embodiment of FIG. 6a, the reconfigurable CLE 500 functions as a single-stage CLE (e.g. CLE 200 of FIG. 2a). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal that is weighted by multiplication block 599 using a first antenna weight AW1. The weighted signal then is transferred to the NLMS equalizer 504a, which calculates a norm square (NS block) by squaring the values stored at each tap delay and adding them together. The output of equalizer 504a is obtained using a FIR (Finite Impulse Response) filtering operation (FIR block), passed through mux 524f (set to input 0), and compared with a desired signal "PN1" using subtracter 531a. The output of subtracter 531a is conjugated by conjugate block 532a and input to multiplication block 533a. The multiplication block 533a also receives as input the result of dividing the norm square by an adaptation coefficient "$\mu_1$" (i.e., the norm square value is normalized using $\mu_1$), which is carried out by the divider block 534a. As shown, the norm square value is passed to divider 534a through mux 524a (set to input 0). The multiplication block 533a multiplies the normalized norm square by the conjugated difference between the equalizer 504a output and the desired (pilot) signal "PN1", whereby weight coefficients (filter tap weights) are updated (WU block). The FIR output of equalizer 504a is forwarded to descrambler/despreader 506b through mux 524g (set to input 1). As previously explained for single-stage CLE 200, the embodiment of reconfigurable CLE 500 shown in FIG. 6a may preferably be used with MDPEs similar to that shown in FIG. 1b, wherein multipath sub-signals arrive in consecutive chip-time units. Alternatively, the embodiment of the reconfigurable CLE 500 shown in FIG. 6a also may be used when a substantial amount of the energy of the MDPE is contained within one sub-signal.

Figure 6B:
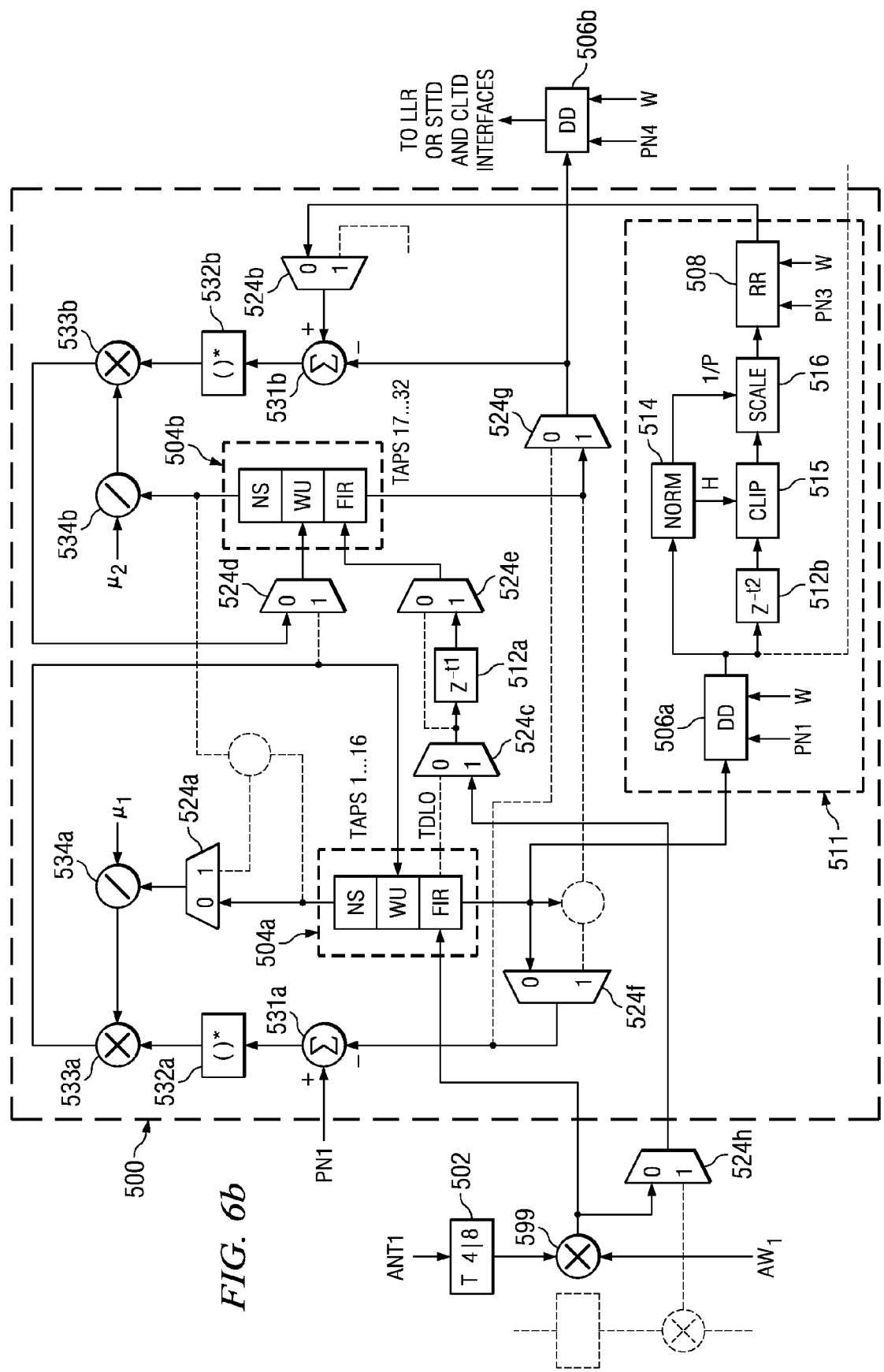

FIG. 6b is a block diagram illustrating an embodiment of the reconfigurable CLE 500 of FIG. 5 in a two-stage configuration. As shown, bold line portions of the reconfigurable CLE 500 are preferably enabled in the two-stage configuration. In the embodiment of FIG. 6b, the reconfigurable CLE 500 functions as a two-stage CLE (e.g. CLE 210 of FIG. 2b). As was previously described, the reconfigurable CLE 500 may be coupled between a downsampler 502, and a descrambler/despreader block 506b.

As shown, digitized samples of a received wireless signal may be input to the downsampler 502, which resamples the input at a lower sampling rate, (e.g., resample every $4^{th}$ or $8^{th}$ input sample). The downsampler 502 outputs a signal to equalizer 504a and to delay line 512a after the signal is weighted by multiplication block 599 using a first antenna weight AW1. As shown, delay line 512a receives the downsampler output through mux 524h (set to 0) and mux 524c (set to input 1). Equalizer 504a outputs a FIR filtered signal which is sent through mux 524f (set to input 0), whereby the received signal is compared with a pilot signal "PN1"0 by subtracter 531a. The result of subtracter 531a is conjugated by conjugate block 532a and input to multiplication block 533a. The multiplication block 533a also receives as input the result of dividing the norm square by the adaptation coefficient "$\mu_1$" (i.e., the norm square value is normalized using $\mu_1$), which is carried out by divider block 534a. As shown, the norm square value is passed directly to divider 534a through mux 524a (set to input 0). The multiplication block 533a multiplies the normalized norm square by the conjugated difference between the equalizer 504a output and the desired (pilot) signal "PN1", whereby weight coefficients (filter tap weights) are updated and stored in the weight update (WU) block of equalizer 504a.

The output of the equalizer 504a is forwarded to signal regeneration block 511, which may comprise a descrambler/despreader 506a, a normalize block 514, a delay line 512b, a clipping block 515, a scaling block 516, and a rescrambler/respreader block 508. The signal regeneration block 511 despreads, averages, normalizes, and respreads the output of equalizer 504a. The output of signal regeneration block 511 is then input to subtracter block 531b through mux 524b (set to input 0). The subtracter block 531b calculates the difference between the regenerated signal from regeneration block 511 and the FIR output of equalizer 504b. This difference is conjugated by conjugator 532b and input to multiplication block 533b. The multiplication block 533b also receives the normalized norm square of the input to equalizer 504b, which is divided (normalized) by adaptation coefficient "$\mu_2$" using divider 534b. As shown in FIG. 6b, equalizer 504b may receive the original input signal from downsampler 502 through mux 524c (set to input 1), delay line 512a, and mux 524e (set to input 1). The output of multiplication block 533b is used to update the weight coefficients (filter tap weights) of equalizer 504b (stored in the weight update "WU" block).

As previously explained, using the reconfigurable CLE 500 as a two-stage CLE (e.g. CLE 210) may allow tracking changes in a wireless channel more quickly and accurately than would be possible with a single-stage CLE (e.g., CLE 200). As shown, the equalizers 504a and 504b of FIG. 6b may each have their own calculation resources (e.g., divider, subtracter, conjugator, multiplier), which are used update the weight coefficients as previously described. As was previously mentioned for the two-stage CLE 210, the embodiment of reconfigurable CLE 500 shown in FIG. 6b may preferably be used with MDPEs similar to those shown in FIGS. 1b and 1c.

Figure 6C:
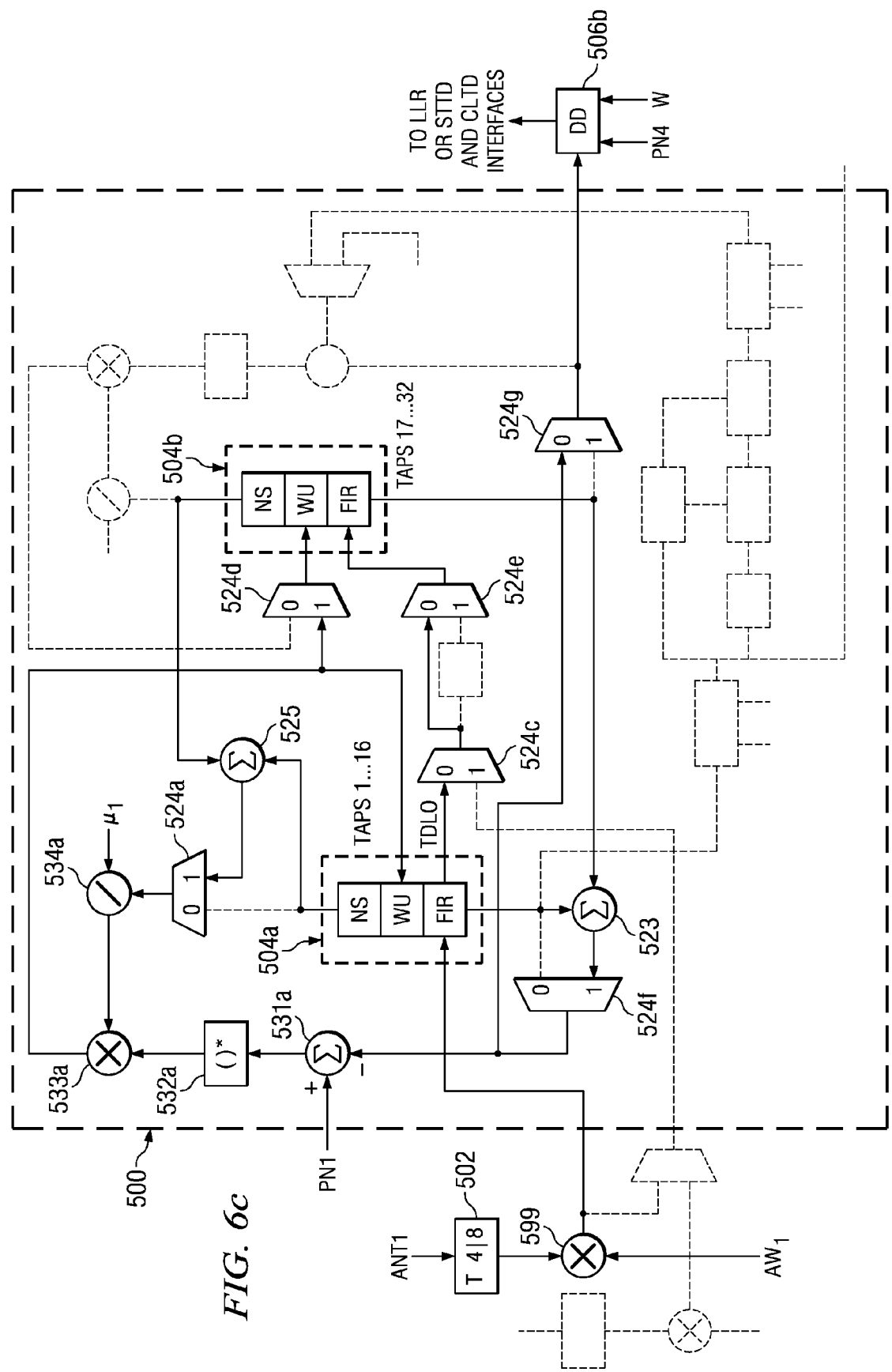

FIG. 6c is a block diagram illustrating an embodiment of the reconfigurable CLE 500 of FIG. 5 in a "concatenated" configuration. As shown, bold line portions of the reconfigurable CLE 500 are preferably enabled in the concatenated configuration. In the embodiment of FIG. 6c, the reconfigurable CLE 500 functions as a concatenated CLE (e.g. CLE 220 of FIG. 2c). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal to the multiplication block 599, whereby the signal is weighted using a first antenna weight AW1. The weighted signal then is transferred to the NLMS equalizer 504a, which calculates a norm square (NS block) by squaring the values stored at each tap delay and adding them together. The tap delay line output ("TDLO") of equalizer 504a may be passed to equalizer 504b through mux 524c (set to input 0) and mux 524e (set to input 0).

The norm squares of equalizers 504a and 504b are summed by summation block 525 to create a combined norm square. The combined norm square is input to divider 534a through mux 524a (set to input 1), which divides the combined norm square by adaptation coefficient "$\mu_1$" (i.e., the combined norm square is normalized by $\mu_1$), and outputs a result to multiplication block 533a. Meanwhile, the FIR outputs of equalizers 504a and 504b are summed by summation block 523 and compared to a pilot signal "PN1" using subtracter 531a. As shown, the summed equalizer FIR outputs are forwarded to subtracter 531a through mux 524f (set to input 1). The output of subtracter 531a is conjugated by conjugate block 532a and input to multiplier 533a. The multiplication block multiplies the normalized combined norm square described above by the conjugated difference between the pilot signal and the summed equalizer outputs described above. The output of multiplication block 533a may then be used to update weight coefficients (filter tap weights) stored in the WU (weight update) blocks of equalizers 504a and 504b. As shown, the output of multiplier 533a is coupled to the WU block of equalizer 504b through mux 524d (set to input 1).

The combined FIR outputs of equalizers 504a and 504b are forwarded to descrambler/despreader block 506b through mux 524g (set to input 0). As previously explained for concatenated CLE 220, the embodiment of reconfigurable CLE 500 shown in FIG. 6c may preferably be used with MDPEs similar to that shown in FIG. 1d, wherein multipath sub-signals are spread out over a large number of chip-time units.

Figure 6D:
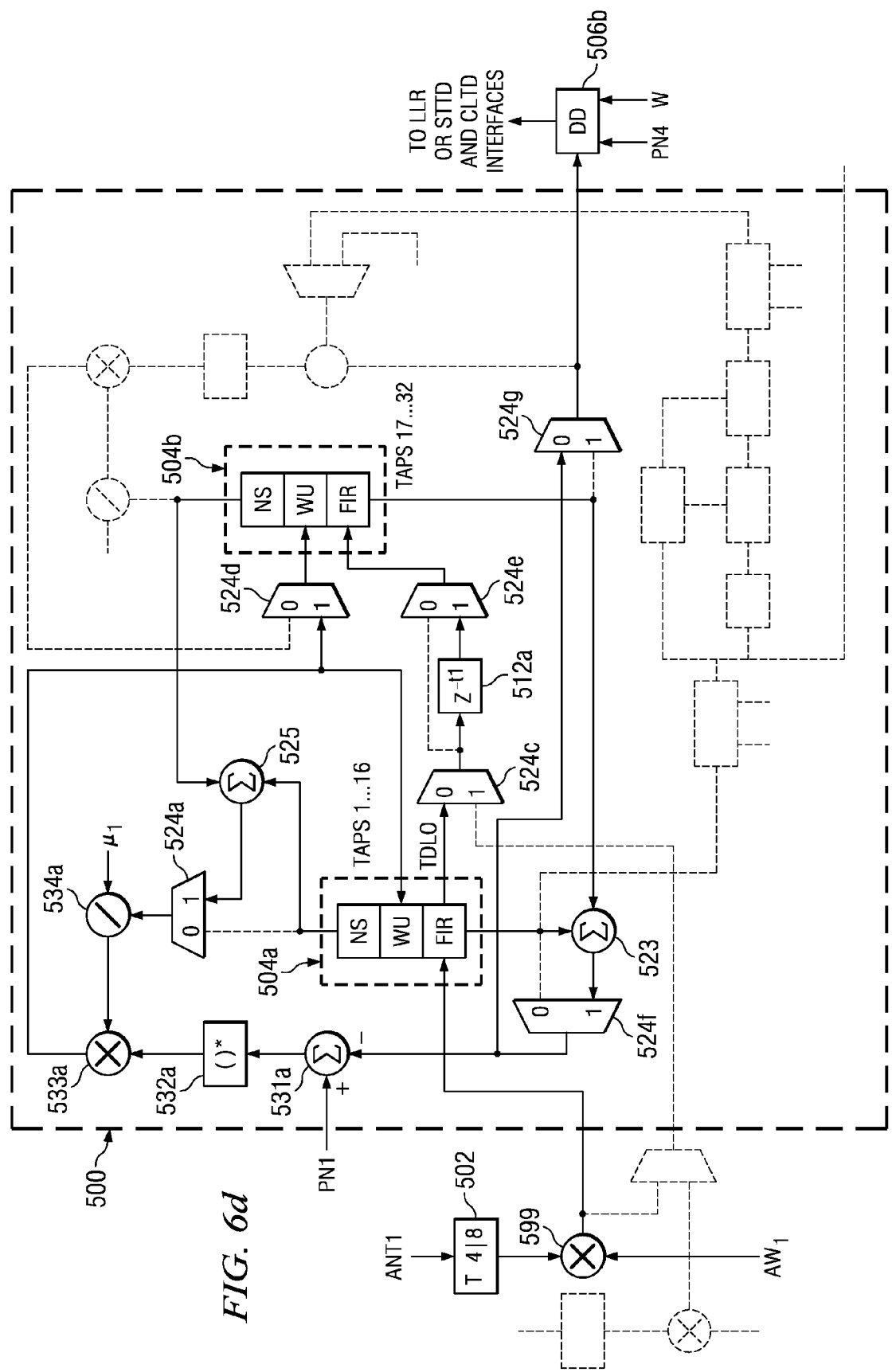

FIG. 6d is a block diagram illustrating an embodiment of the reconfigurable CLE 500 of FIG. 5 in a "sparse" configuration. As shown, bold line portions of the reconfigurable CLE 500 are preferably enabled in the sparse configuration. In the embodiment of FIG. 6d, the reconfigurable CLE 500 functions as a sparse CLE (e.g. CLE 230 of FIG. 2d). As was previously described for CLE embodiments, the reconfigurable CLE 500 may be coupled between a downsampler 502, and a descrambler/despreader block 506b.

As shown, the reconfigurable CLE embodiment of FIG. 6d is the same as the reconfigurable CLE embodiment of FIG. 6c with the exception that delay line 512a is used in FIG. 6d. As shown, delay line 512a is activated by setting mux 524e to input 1 instead of input 0 as was the case in the concatenated embodiment of FIG. 5c. As a result, the "sparse" configuration functions the same as the "concatenated" configuration explained above, except that a delay (using delay line 512a) may be added between the TDLO output of equalizer 504a and the FIR input of equalizer 504b. As previously explained the sparse configuration may preferably be used with MDPEs in which clusters of multipath sub-signals are separated by a large number of chip-time units as in FIG. 1e.

Figure 6E:
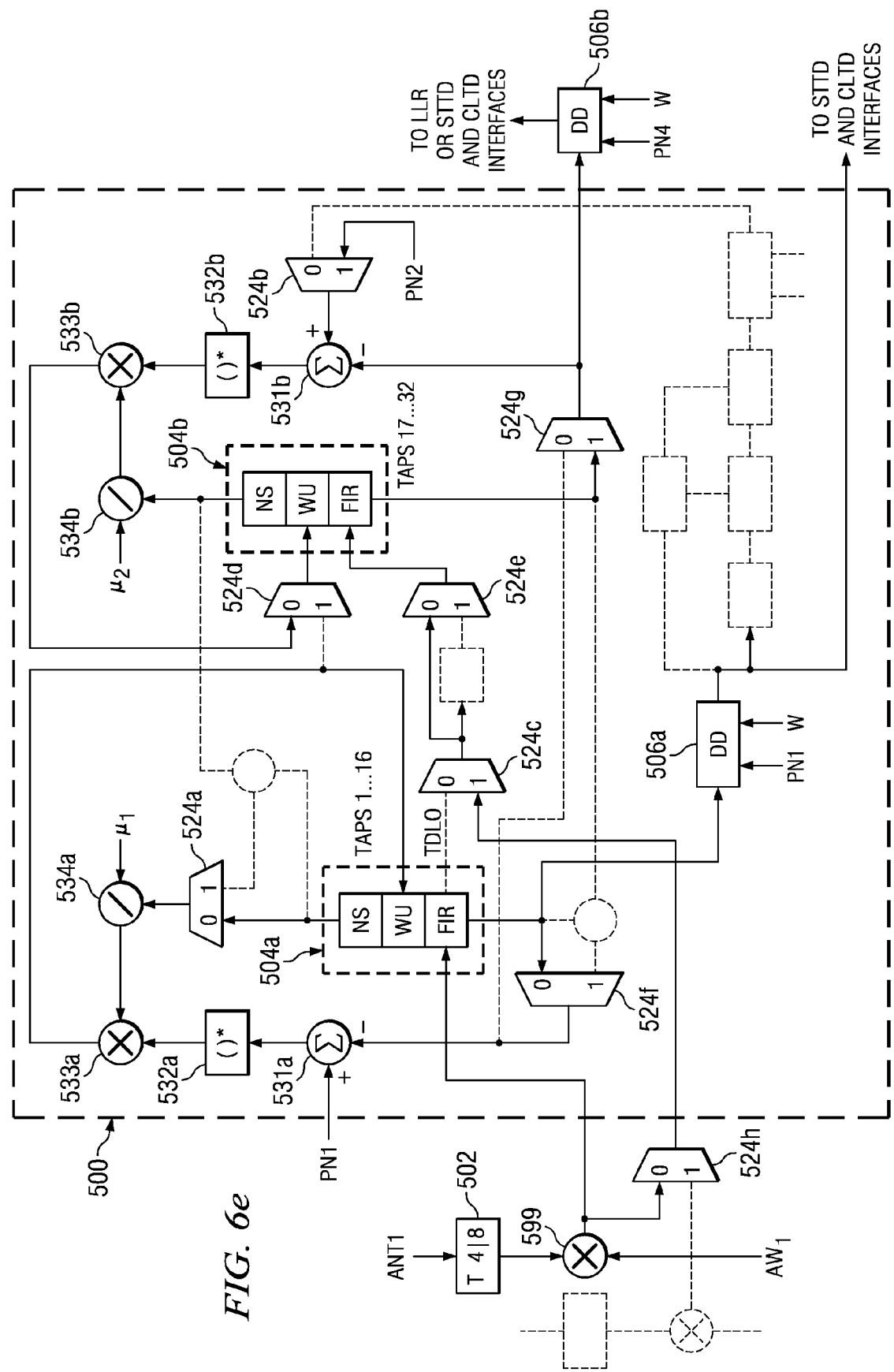

FIG. 6e is a block diagram illustrating an embodiment of the reconfigurable CLE 500 of FIG. 5 in a single-stage equalizer pair configuration (also called transmit diversity configuration). As shown, bold line portions of reconfigurable CLE 500 are preferably enabled during the transmit diversity configuration. In the embodiment of FIG. 6e, the reconfigurable CLE 500 functions as two single-stage CLEs, (i.e. two single-stage CLEs 200 as shown in FIG. 2a). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal to the multiplication block 599, which weights the signal with an antenna weight AW1. The weighted signal then is transferred to equalizers 504a and 504b, which each calculate a norm square (NS block) as previously described. As shown, equalizer 504b receives the output of downsampler 502 through mux 524h (set to input 0), mux 524c (set to input 1) and mux 524e (set to input 0). The output of equalizers 504a and 504b are obtained using FIR (Finite Impulse Response) filtering operations (FIR blocks). As shown, the filter tap weights of equalizer 504a may be updated by comparing the FIR output of equalizer 504a with a pilot signal "PN1" and calculating the filter tap weights as previously described. Additionally, the filter tap weights of equalizer 504b may be updated by comparing the FIR output of equalizer 504b with a pilot signal "PN2" which is selected through mux 524b (set to input 1) and calculating new filter weights as previously described. The FIR output of equalizer 504a may be received by descrambler/despreader 506a, which descrambles and despreads the signal as previously described and outputs a signal to a STTD and/or CLTD interface. Likewise, the FIR output of equalizer 504b may be received by descrambler/despreader 506b, which descrambles and despreads the FIR outputs of equalizer 504b and outputs a signal to the STTD and/or CLTD interface. The weight coefficients (filter tap weights) are calculated for both equalizers 504a and 504b as previously described.

Figure 7A:
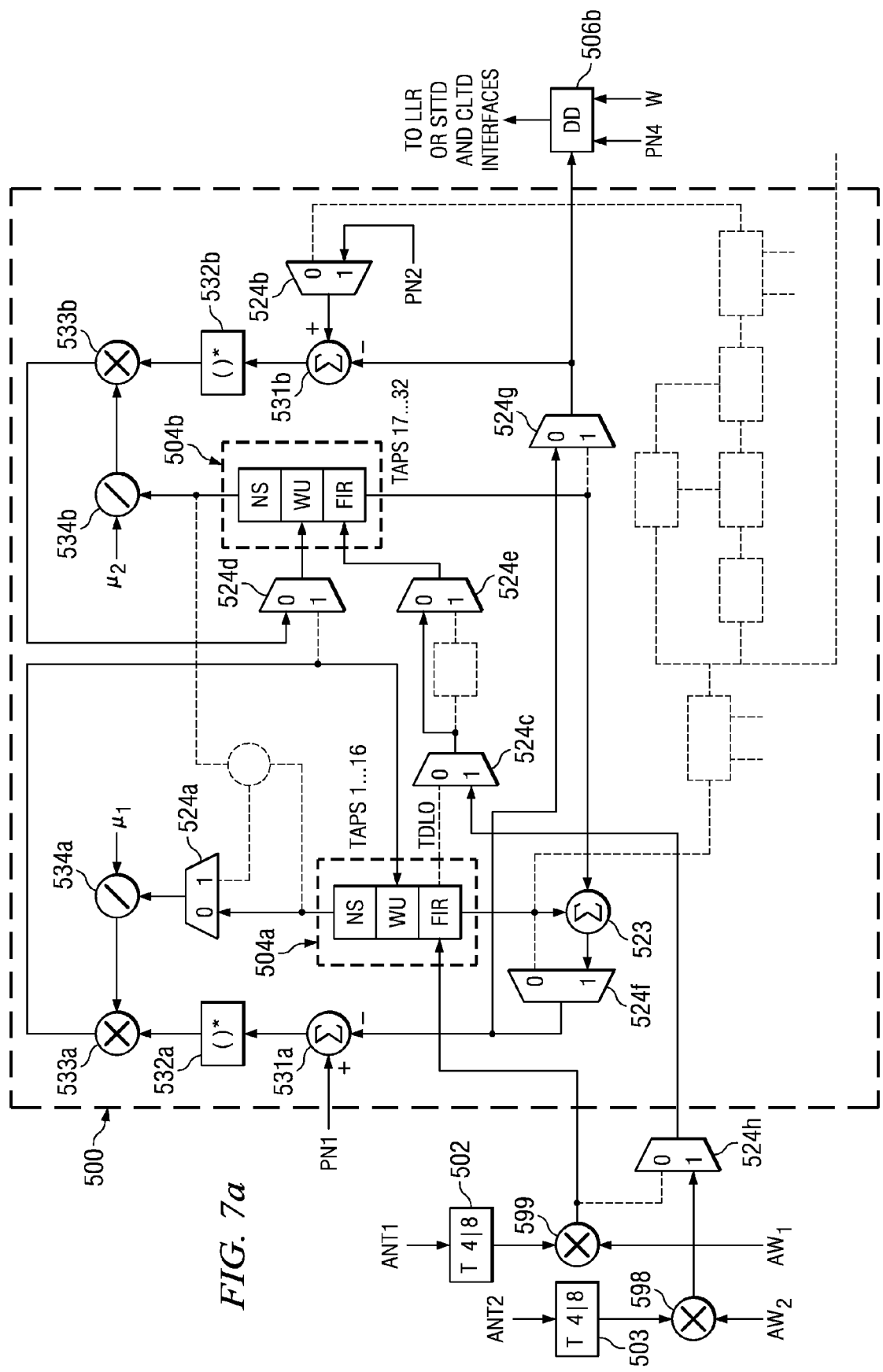
FIGS. 7a and 7b show additional operating modes of the reconfigurable chip level equalizers in accordance with embodiments of the invention.

In addition to single-antenna receiver systems as described in FIGS. 5 and 6a-6e, multiple-antenna receiver systems also may be used. FIG. 7a shows a block diagram of a receiving system comprising an embodiment of the reconfigurable CLE 500 of FIG. 5. The block diagram of FIG. 7a corresponds to the configuration shown and described in context of FIG. 2e above. As shown in FIG. 7a, bold line portions of the CLE 500 are preferably enabled. The embodiment shown in FIG. 7a preferably is used with MDPEs such as those shown in FIG. 1f (i.e., receive antenna diversity, wherein one transmitting antenna and multiple receiving antennas are used). Because two antennas ANT1, ANT2 are present in the receiving system, two downsamplers 502, 503 also are present in the receiving system, each downsampler coupled to a different receiving antenna. After being processed by the downsamplers 502, 503 as previously described, the received signals are multiplied by antenna weights in multipliers 599, 598, respectively. The signals that are output from the multipliers 599, 598 then are transferred into the CLE 500, possibly by way of a multiplexer 524h (set to input 1). Signals output by the CLE 500 are processed by the descrambler/despreader module 506b as previously described.

More specifically, in the CLE 500, a signal that is output from mux 524h is transferred to the FIR module of equalizer 504b by way of muxes 524c (set to input 1) and 524e (set to input 0). The signal output from the multiplication block 599 is forwarded to the FIR module of equalizer 504a. The output of the NS block of the equalizer 504b is divided by adaptation coefficient $\mu_2$ in the divider 534b. The output of the divider 534b then is routed to the multiplier 533b, where it is multiplied by the output of the conjugate block 532b. The output of the conjugate block 532b is produced by summing the current outputs of the FIR blocks of both equalizers 504a and 504b and routing them to subtraction block 531b by way of the muxes 524f (set to input 1) and 524g (set to input 0), subtracting this input with PN2 (which is supplied via mux 524b, set to input 1) at the subtraction block 531b, and transferring the output of the subtraction block 531b to the conjugate block 532b. The output of the multiplication block 533b subsequently is used to update the WU block of the equalizer 504b via mux 524d (set to input 0).

The output of the NS block of equalizer 504a is divided by adaptation coefficient $\mu_1$ at divider 534a. The output of the divider 534a is multiplied with the output of the conjugate block 532a at the multiplication block 533a. The output of the conjugate block 532a is produced by routing the combination of the current FIR module outputs of equalizers 504a, 504b to the subtracter 531a via the mux 524f (set to input 1). This input signal is combined with PN1 at the subtracter 531a and the result is output to the conjugate block 532a. The output of the multiplication block 533a is used to update the WU block of the equalizer 504a. The combination of the FIR block outputs of both the equalizers 504a, 504b then is routed to the descrambler/despreader block 506b by way of the muxes 524f (set to input 1) and 524g (input 0).

Figure 7B:
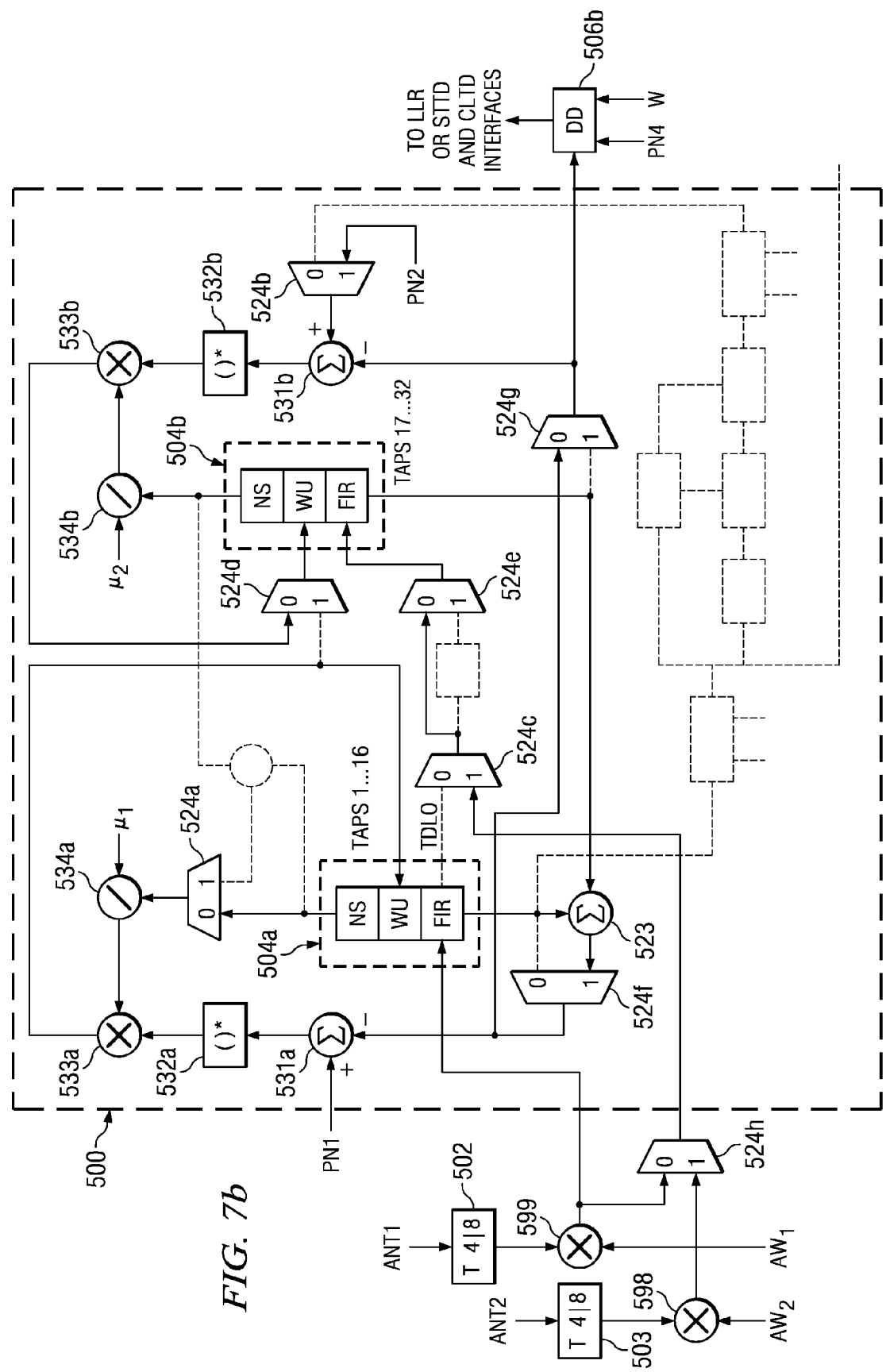

FIG. 7b shows a block diagram of a receiving system comprising a CLE 500. The CLE 500 of FIG. 7b functions substantially the same as that in FIG. 7a, except for the use of a "sharing mechanism" as described below. Specifically, the block diagram of FIG. 7b corresponds to that shown and described above in context of FIG. 2f. However, unlike FIG. 2f, which shows four equalizers being used, the block diagram of FIG. 7b only comprises two equalizers because of the lower costs associated with the use of less hardware. The four equalizers shown in FIG. 2f are reduced to two equalizers in FIG. 7b by way of "sharing" among the rest of the architecture, which may comprise sharing use of the equalizers over time, or some other method of appropriating equalizer use. For example, the clock frequency of the equalizers may be doubled, thus enabling the equalizer to process data at a faster rate and reducing the number of equalizers required to maintain suitable levels of performance. The architecture of FIG. 7b preferably is used in communication systems having multiple transmitter antennas and multiple receiver antennas (i.e., systems having MDPEs such as those shown in FIG. 1g).

FIG. 8 shows a block diagram illustration a method 899 of selecting an operating mode of a reconfigurable CLE (e.g., reconfigurable CLE 500). As shown in FIG. 8, the method 900 may comprise determining whether there are two transmit antennas and two receive antennas (block 900). If block 900 is "true" (i.e., there are two transmit antennas and two receive antennas), then the 2×2 TX/RX diversity mode may be used (block 901). If block 900 is "false," then the method may continue by determining whether there are two receive antennas (block 902). If block 902 is "true," then the RxD mode may be used (block 903). Otherwise, if block 902 is "false," then the method may continue by determining whether there are two transmit antennas (block 904).

If block 904 is "true," then the TxD mode may be used (block 905). Otherwise, if block 904 is "false," then the method may continue by determining the length of the MDPE (block 906). If the length is short, then the method comprises determining whether there is a single significant path (block 907). If block 907 is "true," then the single stage equalizer mode may be used (block 908). If block 907 is "false," then the two stage equalizer mode may be used (block 909).

If, however, the length of the MDPE at block 906 is long, then the method comprises determining whether a sufficient amount of energy (e.g., 95% of total energy) is captured using two stage mode (block 910). If block 910 is "true," then the two stage equalizer mode is used (block 909). If block 910 is "false," then the method may comprise determining the number of energy clusters (block 911). If there is one energy cluster, then the concatenated equalizer mode may be used (block 913). Otherwise, if there are two clusters, then the sparse equalizer mode may be used (block 912).

The above discussion is meant to be illustrative of the principles and various embodiments of the present invention.

Numerous other variations and modifications will become apparent to those skilled in the art once the above disclosure is fully appreciated. It is intended that the following claims be interpreted to embrace all such variations and modifications.

What is claimed is:

1. A system, comprising:
a plurality of adaptive equalizers adapted to couple to a plurality of receive antennas, each of said antennas capable of receiving a multipath delay profile estimate (MDPE);
control logic interconnecting at least some of the adaptive equalizers; and
a control mechanism that, according to different MDPEs, configures at least some of the adaptive equalizers and circuit control logic.

2. The system of claim 1, further comprising a second control mechanism that disables at least a portion of said control logic according to the different MDPEs.

3. The system of claim 2, further comprising a third control mechanism that disables a computation resource of at least one of said adaptive equalizers according to the different MDPEs.

4. The system of claim 3, wherein the first, second and third control mechanisms comprise multiplexers that receive control signals according to the different MDPEs.

5. The system of claim 1, wherein at least one of the adaptive equalizers comprises a computational resource.

6. The system of claim 5, wherein the computation resource comprises at least one item selected from the group consisting of a summer, a conjugation block, a multiplier and a divider.

7. The system of claim 1, wherein said control logic comprises at least one item selected from the group consisting of: a signal regenerator; a delay line; and a summer.

8. The system of claim 1, wherein the different multipath delay profile estimates (MDPEs) comprise at least one MDPE selected from the group consisting of:
sub-signals, at least some of which arrive to the system in consecutive chip time units; sub-signals, at least one of which comprises a substantial amount of total energy of the sub-signals;
sub-signals that do not all arrive to the system in consecutive chip time units;
sub-signals, at least some of which arrive to the system in two or more clusters;
sub-signals, at least some of which arrive to the system by way of more than one receive antenna; and
sub-signals, at least some of which arrive to the system in groups of two or more.

9. The system of claim 1, wherein the MDPEs are received substantially simultaneously.

10. A receiver, comprising:
at least two antennas, each antenna capable of transmitting or receiving a multipath delay profile estimate (MDPE);
at least two adaptive equalizers coupled to said antennas; at least one control logic module that interconnects at least two of the adaptive equalizers; and
a control mechanism that, according to different MDPEs, configures the adaptive equalizers and the at least one control logic module.

11. The receiver of claim 10, further comprising a second control mechanism that uses at least one of the MDPEs to disable at least one control logic module.

12. The receiver of claim 11, further comprising a third control mechanism that uses at least one of the different MDPEs to disable at least one control logic module.

13. The receiver of claim 10, wherein the different MDPEs comprise at least one MDPE selected from a group consisting of:
sub-signals that arrive to the receiver by way of more than one receiving
antenna; sub-signals that arrive to the receiver in groups of at least two;
sub-signals that arrive to the receiver in consecutive chip time units;
sub-signals wherein at least one sub-signal comprises a majority of total energy of the sub-signals;
sub-signals, not all of which arrive to the receiver in consecutive chip time units; and
sub-signals that arrive to the receiver in two or more clusters.

14. A method, comprising: determining an attribute of at least one of a plurality of multipath delay profile estimates (MDPEs), each MDPE received substantially simultaneously by way of a separate antenna; and operating two or more adaptive equalizers according to said attribute of the MDPEs.

15. The method of claim 14, wherein determining the attribute of at least one of the plurality of MDPEs comprises determining a number of antennas at a receiver.

16. The method of claim 14, wherein determining the attribute of at least one of the plurality of MDPEs comprises determining a number of antennas at a transmitter.

17. The method of claim 14, further comprising disabling at least one of the adaptive equalizers.

18. A system, comprising: at least two receive antennas, each antenna capable of receiving a multipath delay profile estimate (MDPE); at least two adaptive equalizers coupled to said receive antennas; control logic coupled to the at least two adaptive equalizers; means for selectively interconnecting the at least two adaptive equalizers and the control logic; and means for configuring the at least two adaptive equalizers and control logic according to attributes of at least one MDPE.

19. The system of claim 18, further comprising means for disabling at least a portion of the control logic.

20. The system of claim 18, further comprising means for disabling a computational resource of at least one of the adaptive equalizers.

21. The system of claim 18, wherein the attributes of the MDPE comprise at least one selected from the group consisting of: a number of antennas that transmit the multipath signal; a number of antennas that receive the multipath signal; a length of the MDPE; an amount of energy in a single sub-signal of the multipath signal; an amount of capturable energy by a number of adaptive equalizers; and a number of energy clusters.

* * * * *